US010699350B1

(12) United States Patent
Suizzo et al.

(10) Patent No.: US 10,699,350 B1
(45) Date of Patent: *Jun. 30, 2020

(54) AUTOMATIC EXCHANGE OF INFORMATION IN RESPONSE TO A COLLISION EVENT

(71) Applicant: Allstate Insurance Company, Northbrook, IL (US)

(72) Inventors: Nicholas A. Suizzo, Cody, WY (US); Alinawaz Ismaili, Skokie, IL (US); Jennifer A. Brandmaier, Chicago, IL (US); James Gillespie, Belfast (GB); Stephen Hughes, Belfast (GB); Daniel Koza, Hinsdale, IL (US); William Loo, Arlington Heights, IL (US); Francis Lowry, Clogher (GB)

(73) Assignee: Allstate Insurance Company, Northbrook, IL (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/003,384

(22) Filed: Jun. 8, 2018

Related U.S. Application Data

(63) Continuation of application No. 14/313,753, filed on Jun. 24, 2014, which is a continuation-in-part of
(Continued)

(51) Int. Cl.
*G06Q 40/08* (2012.01)

(52) U.S. Cl.
CPC .................................. *G06Q 40/08* (2013.01)

(58) Field of Classification Search
CPC ..................................................... G06Q 40/08
See application file for complete search history.

(56) References Cited

U.S. PATENT DOCUMENTS 4,638,289 A 1/1987 Zottnik
5,450,329 A 9/1995 Tanner
(Continued)

FOREIGN PATENT DOCUMENTS

AU 2002301438 B2 9/2006
AU 2007200869 A1 3/2007
(Continued)

OTHER PUBLICATIONS

Jeevagan et al. RFID Based Vehicle Identification During Collisions. R.V. College of Engineering, Dept. of Instrumentation Technology. Bangalore, Karnataka, India. IEEE Global Humanitarian Technology Conference (GHTC). Downloaded from google/scholar Nov. 13, 2017.*

(Continued)

*Primary Examiner* — Muriel S Tinkler
(74) *Attorney, Agent, or Firm* — Banner & Witcoff, Ltd.

(57) ABSTRACT

Systems and methods for the automatic exchange of insurance information in response to a collision event are provided. A wireless communication device may collect telematics data related to operation of a vehicle. The wireless communication device may detect the occurrence of a collision event involving the vehicle based on the telematics data collected. The wireless communication device may discover another wireless communication device locating in the vicinity of the collision event that has also detected a collision event. The wireless device may initiate an exchange of insurance information with that other wireless communication device. Other types of information may be exchanged between the wireless devices as well as between an insurance system in signal communication with the wireless devices in response to a collision event.

20 Claims, 8 Drawing Sheets

Related U.S. Application Data application No. 14/039,722, filed on Sep. 27, 2013, which is a continuation-in-part of application No. 13/791,338, filed on Mar. 8, 2013, now Pat. No. 8,799,034, which is a continuation-in-part of application No. 13/791,386, filed on Mar. 8, 2013, now Pat. No. 9,019,092.

(56) References Cited

U.S. PATENT DOCUMENTS

| | | | |
|---|---|---|---|
| 5,742,699 A | 4/1998 | Adkins et al. | |
| 5,950,169 A | 9/1999 | Borghesi et al. | |
| 6,027,415 A | 2/2000 | Takeda | |
| 6,060,989 A | 5/2000 | Gehlot | |
| 6,061,610 A | 5/2000 | Boer | |
| 6,076,028 A | 6/2000 | Donnelly et al. | |
| 6,141,611 A | 10/2000 | Mackey et al. | |
| 6,211,777 B1 | 4/2001 | Greenwood et al. | |
| 6,246,933 B1 * | 6/2001 | Bague | G07C 5/085 340/438 |
| 6,262,657 B1 | 7/2001 | Okuda et al. | |
| 6,295,492 B1 | 9/2001 | Lang et al. | |
| 6,330,499 B1 | 12/2001 | Chou et al. | |
| 6,472,982 B2 | 10/2002 | Eida et al. | |
| 6,509,868 B2 | 1/2003 | Flick | |
| 6,594,579 B1 | 7/2003 | Lowrey et al. | |
| 6,611,740 B2 | 8/2003 | Lowrey et al. | |
| 6,641,038 B2 | 11/2003 | Gehlot et al. | |
| 6,701,234 B1 | 3/2004 | Vogelsang | |
| 6,732,020 B2 | 5/2004 | Yamagishi | |
| 6,732,031 B1 | 5/2004 | Lightner et al. | |
| 6,741,168 B2 | 5/2004 | Webb et al. | |
| 6,762,020 B1 | 7/2004 | Mack et al. | |
| 6,765,499 B2 | 7/2004 | Flick | |
| 6,798,356 B2 | 9/2004 | Flick | |
| 6,909,947 B2 | 6/2005 | Douros et al. | |
| 6,925,425 B2 | 8/2005 | Remboski et al. | |
| 6,946,966 B2 | 9/2005 | Koenig | |
| 6,980,313 B2 | 12/2005 | Sharif et al. | |
| 6,982,654 B2 | 1/2006 | Rau et al. | |
| 6,988,033 B1 | 1/2006 | Lowrey et al. | |
| 7,069,118 B2 | 6/2006 | Coletrane et al. | |
| 7,082,359 B2 | 7/2006 | Breed | |
| 7,092,803 B2 | 8/2006 | Kapolka et al. | |
| 7,113,127 B1 | 9/2006 | Banet et al. | |
| 7,119,669 B2 | 10/2006 | Lundsgaard et al. | |
| 7,129,826 B2 | 10/2006 | Nitz et al. | |
| 7,133,611 B2 | 11/2006 | Kaneko | |
| 7,143,290 B1 | 11/2006 | Ginter et al. | |
| 7,155,259 B2 | 12/2006 | Bauchot et al. | |
| 7,155,321 B2 | 12/2006 | Bromley et al. | |
| 7,174,243 B1 | 2/2007 | Lightner et al. | |
| 7,271,716 B2 | 9/2007 | Nou | |
| 7,305,293 B2 | 12/2007 | Flick | |
| 7,348,895 B2 | 3/2008 | Lagassey | |
| 7,477,968 B1 | 1/2009 | Lowrey et al. | |
| 7,565,230 B2 | 7/2009 | Gardner et al. | |
| 7,671,727 B2 | 3/2010 | Flick | |
| 7,715,961 B1 | 5/2010 | Kargupta | |
| 7,747,365 B1 | 6/2010 | Lowrey et al. | |
| 7,970,834 B2 | 6/2011 | Daniels et al. | |
| 8,000,979 B2 | 8/2011 | Blom | |
| 8,014,789 B2 | 9/2011 | Breed | |
| 8,019,629 B1 | 9/2011 | Medina, III et al. | |
| 8,041,635 B1 * | 10/2011 | Garcia | G06Q 20/10 705/39 |
| 8,069,060 B2 | 11/2011 | Tipirneni | |
| 8,090,598 B2 | 1/2012 | Bauer et al. | |
| 8,140,358 B1 | 3/2012 | Ling et al. | |
| 8,214,100 B2 | 7/2012 | Lowrey et al. | |
| 8,229,759 B2 | 7/2012 | Zhu et al. | |
| 8,260,639 B1 * | 9/2012 | Medina, III | G06Q 40/08 705/4 |
| 8,271,187 B2 | 9/2012 | Taylor et al. | |
| 8,285,588 B2 | 10/2012 | Postrel | |
| 8,311,858 B2 | 11/2012 | Everett et al. | |
| 8,321,086 B2 | 11/2012 | Park et al. | |
| 8,330,593 B2 | 12/2012 | Golenski | |
| 8,370,254 B1 | 2/2013 | Hopkins, III et al. | |
| 8,401,877 B2 | 3/2013 | Salvagio | |
| 8,403,225 B2 | 3/2013 | Sharra et al. | |
| 8,417,604 B2 | 4/2013 | Orr et al. | |
| 8,423,239 B2 | 4/2013 | Blumer et al. | |
| 8,432,262 B2 | 4/2013 | Talty et al. | |
| 8,433,590 B2 | 4/2013 | Prescott | |
| 8,438,049 B2 | 5/2013 | Ranicar, III et al. | |
| 8,442,508 B2 | 5/2013 | Harter et al. | |
| 8,447,459 B2 | 5/2013 | Lowrey et al. | |
| 8,452,486 B2 | 5/2013 | Banet et al. | |
| 8,463,488 B1 | 6/2013 | Hart | |
| 8,466,781 B2 | 6/2013 | Miller et al. | |
| 8,478,514 B2 | 7/2013 | Kargupta | |
| 8,484,113 B2 | 7/2013 | Collopy et al. | |
| 8,494,938 B1 | 7/2013 | Kazenas | |
| 8,510,200 B2 | 8/2013 | Pearlman et al. | |
| 8,527,135 B2 | 9/2013 | Lowrey et al. | |
| 8,547,435 B2 | 10/2013 | Mimar | |
| 8,571,895 B1 * | 10/2013 | Medina, III | G06Q 40/08 705/4 |
| 8,577,703 B2 | 11/2013 | McClellan et al. | |
| 8,595,034 B2 | 11/2013 | Bauer et al. | |
| 8,598,977 B2 | 12/2013 | Maalouf et al. | |
| 8,620,692 B2 | 12/2013 | Collopy et al. | |
| 8,630,768 B2 | 1/2014 | McClellan et al. | |
| 8,633,985 B2 | 1/2014 | Haynes et al. | |
| 8,635,091 B2 | 1/2014 | Amigo et al. | |
| 8,645,014 B1 | 2/2014 | Kozlowski et al. | |
| 8,799,034 B1 | 8/2014 | Brandmaier et al. | |
| 8,903,852 B1 | 12/2014 | Pedregal et al. | |
| 8,935,036 B1 | 1/2015 | Christensen et al. | |
| 9,325,807 B1 | 4/2016 | Meoli et al. | |
| 2002/0063637 A1 | 5/2002 | Eida et al. | |
| 2002/0111725 A1 | 8/2002 | Burge | |
| 2002/0135679 A1 | 9/2002 | Scaman | |
| 2003/0212567 A1 | 11/2003 | Shintani et al. | |
| 2003/0233261 A1 | 12/2003 | Kawahara et al. | |
| 2004/0083123 A1 | 4/2004 | Kim et al. | |
| 2004/0088090 A1 | 5/2004 | Wee | |
| 2004/0186744 A1 | 9/2004 | Lux | |
| 2004/0189493 A1 | 9/2004 | Estus et al. | |
| 2004/0205622 A1 | 10/2004 | Jones et al. | |
| 2005/0021374 A1 | 1/2005 | Allahyari | |
| 2005/0161505 A1 | 7/2005 | Yin et al. | |
| 2005/0216487 A1 | 9/2005 | Fisher et al. | |
| 2005/0278082 A1 | 12/2005 | Weekes | |
| 2006/0224305 A1 | 10/2006 | Ansari et al. | |
| 2006/0226960 A1 | 10/2006 | Pisz et al. | |
| 2007/0009136 A1 | 1/2007 | Pawlenko et al. | |
| 2007/0043594 A1 | 2/2007 | Lavergne | |
| 2007/0136162 A1 | 6/2007 | Thibodeau et al. | |
| 2007/0162308 A1 | 7/2007 | Peters | |
| 2007/0288268 A1 | 12/2007 | Weeks | |
| 2008/0027761 A1 | 1/2008 | Bracha | |
| 2008/0242261 A1 | 10/2008 | Shimanuki et al. | |
| 2008/0294690 A1 | 11/2008 | McClellan et al. | |
| 2009/0106052 A1 | 4/2009 | Moldovan | |
| 2009/0156243 A1 | 6/2009 | Lichtenfeld et al. | |
| 2009/0164504 A1 | 6/2009 | Flake et al. | |
| 2009/0198772 A1 | 8/2009 | Kim et al. | |
| 2009/0254241 A1 | 10/2009 | Basir | |
| 2009/0265385 A1 | 10/2009 | Beland et al. | |
| 2010/0030540 A1 | 2/2010 | Choi et al. | |
| 2010/0030586 A1 | 2/2010 | Taylor et al. | |
| 2010/0131300 A1 | 5/2010 | Collopy et al. | |
| 2010/0138242 A1 | 6/2010 | Ferrick et al. | |
| 2010/0161491 A1 | 6/2010 | Bauchot et al. | |
| 2010/0174564 A1 | 7/2010 | Stender et al. | |
| 2011/0015946 A1 | 1/2011 | Buckowsky et al. | |
| 2011/0070834 A1 | 3/2011 | Griffin et al. | |
| 2011/0077028 A1 | 3/2011 | Wilkes, III et al. | |
| 2011/0112870 A1 | 5/2011 | Berg et al. | |
| 2011/0153369 A1 | 6/2011 | Feldman et al. | |
| 2011/0161116 A1 | 6/2011 | Peak et al. | |
| 2011/0161118 A1 | 6/2011 | Borden et al. | |

(56) References Cited

U.S. PATENT DOCUMENTS

| | | |
|---|---|---|
| 2011/0185178 A1 | 7/2011 | Gotthardt |
| 2011/0213628 A1 | 9/2011 | Peak et al. |
| 2011/0281564 A1 | 11/2011 | Armitage et al. |
| 2011/0307188 A1 | 12/2011 | Peng et al. |
| 2012/0028680 A1 | 2/2012 | Breed |
| 2012/0047203 A1 | 2/2012 | Brown et al. |
| 2012/0072243 A1 | 3/2012 | Collins et al. |
| 2012/0076437 A1 | 3/2012 | King |
| 2012/0084179 A1 | 4/2012 | McRae et al. |
| 2012/0109690 A1 | 5/2012 | Weinrauch et al. |
| 2012/0109692 A1 | 5/2012 | Collins et al. |
| 2012/0119936 A1 | 5/2012 | Miller et al. |
| 2012/0136802 A1* | 5/2012 | McQuade .......... G06Q 30/0282 705/347 |
| 2012/0150412 A1 | 6/2012 | Yoon et al. |
| 2012/0191476 A1 | 7/2012 | Reid et al. |
| 2012/0197486 A1 | 8/2012 | Elliott |
| 2012/0197669 A1 | 8/2012 | Kote et al. |
| 2012/0209631 A1 | 8/2012 | Roscoe et al. |
| 2012/0209632 A1 | 8/2012 | Kaminski et al. |
| 2012/0230548 A1 | 9/2012 | Calman et al. |
| 2012/0232995 A1 | 9/2012 | Castro et al. |
| 2012/0239417 A1 | 9/2012 | Pourfallah et al. |
| 2012/0242503 A1 | 9/2012 | Thomas et al. |
| 2012/0250938 A1 | 10/2012 | DeHart |
| 2012/0259665 A1 | 10/2012 | Pandhi et al. |
| 2012/0290150 A1 | 11/2012 | Doughty et al. |
| 2012/0303392 A1 | 11/2012 | Depura et al. |
| 2012/0316893 A1 | 12/2012 | Egawa |
| 2012/0330687 A1 | 12/2012 | Hilario et al. |
| 2013/0006674 A1 | 1/2013 | Bowne et al. |
| 2013/0006675 A1 | 1/2013 | Bowne et al. |
| 2013/0018676 A1 | 1/2013 | Fischer et al. |
| 2013/0030642 A1 | 1/2013 | Bradley et al. |
| 2013/0033386 A1 | 2/2013 | Zlojutro |
| 2013/0035964 A1 | 2/2013 | Roscoe et al. |
| 2013/0046510 A1 | 2/2013 | Bowne et al. |
| 2013/0054274 A1 | 2/2013 | Katyal |
| 2013/0073318 A1 | 3/2013 | Feldman et al. |
| 2013/0073321 A1 | 3/2013 | Hofmann et al. |
| 2013/0138267 A1 | 5/2013 | Hignite et al. |
| 2013/0151288 A1 | 6/2013 | Bowne et al. |
| 2013/0166098 A1 | 6/2013 | Lavie et al. |
| 2013/0166326 A1 | 6/2013 | Lavie et al. |
| 2013/0179027 A1 | 7/2013 | Mitchell |
| 2013/0179198 A1 | 7/2013 | Bowne et al. |
| 2013/0190967 A1 | 7/2013 | Hassib et al. |
| 2013/0197945 A1 | 8/2013 | Anderson |
| 2013/0204645 A1 | 8/2013 | Lehman et al. |
| 2013/0211660 A1 | 8/2013 | Mitchell |
| 2013/0226397 A1 | 8/2013 | Kuphal et al. |
| 2013/0289819 A1 | 10/2013 | Hassib et al. |
| 2013/0290036 A1 | 10/2013 | Strange |
| 2013/0297353 A1 | 11/2013 | Strange et al. |
| 2013/0297418 A1 | 11/2013 | Collopy et al. |
| 2013/0300552 A1* | 11/2013 | Chang .......... B60Q 9/00 340/436 |
| 2013/0304517 A1 | 11/2013 | Florence |
| 2013/0311209 A1 | 11/2013 | Kaminski et al. |
| 2013/0316310 A1 | 11/2013 | Musicant et al. |
| 2013/0317860 A1 | 11/2013 | Schumann, Jr. |
| 2013/0339062 A1 | 12/2013 | Brewer et al. |
| 2014/0039934 A1 | 2/2014 | Rivera |
| 2014/0039935 A1 | 2/2014 | Rivera |
| 2014/0100889 A1 | 4/2014 | Tofte |
| 2014/0111542 A1 | 4/2014 | Wan |
| 2014/0197939 A1 | 7/2014 | Stefan et al. |
| 2014/0200924 A1 | 7/2014 | Gilbert et al. |
| 2014/0200929 A1 | 7/2014 | Fitzgerald et al. |
| 2014/0244312 A1 | 8/2014 | Gray et al. |
| 2015/0058045 A1 | 2/2015 | Santora |

FOREIGN PATENT DOCUMENTS

| | | |
|---|---|---|
| CA | 2658219 A1 | 1/2008 |
| DE | 102010001006 A1 | 7/2011 |
| EP | 1826734 A1 | 8/2007 |
| EP | 1965361 A2 | 9/2008 |
| EP | 2481037 A1 | 8/2012 |
| GB | 2486384 A | 6/2012 |
| GB | 2488956 A | 9/2012 |
| KR | 20020067246 A | 8/2002 |
| WO | 2002079934 A2 | 10/2002 |
| WO | 2012045128 A1 | 4/2012 |
| WO | 2012067640 A1 | 5/2012 |
| WO | 2012097441 A1 | 7/2012 |
| WO | 2012106878 A1 | 8/2012 |
| WO | 2012173655 A1 | 12/2012 |
| WO | 2012174590 A1 | 12/2012 |

OTHER PUBLICATIONS

Harding, S. J. (2002). The 'ALVA CAPE' and the Automatic Identification System: The Use of VHF in Collision Avoidance at Sea. The Journal of Navigation, 55(3), 431-442.*

Jul. 5, 2018—U.S. Non-Final Office Action—U.S. Appl. No. 15/235,213.

Aug. 2, 2018—U.S. Non-Final Office Action—U.S. Appl. No. 14/039,722.

Aug. 27, 2018—U.S. Non-Final Office Action—U.S. Appl. No. 14/022,552.

Feb. 18, 2016—U.S. Non-Final Office Action—U.S. Appl. No. 14/039,722.

Apr. 12, 2016—U.S. Non-Final Office Action—U.S. Appl. No. 14/313,052.

May 24, 2016—U.S. Notice of Allowance—U.S. Appl. No. 14/029,469.

Jun. 8, 2016—U.S. Final Office Action—U.S. Appl. No. 14/022,552.

Jul. 1, 2016—U.S. Final Office Action—U.S. Appl. No. 14/039,722.

Sep. 7, 2016—U.S. Office Action—U.S. Appl. No. 14/313,052.

Mar. 22, 2017—U.S. Notice of Allowance—U.S. Appl. No. 14/313,052.

Mar. 24, 2017—U.S. Non-Final Office Action—U.S. Appl. No. 14/022,552.

Jun. 29, 2017—U.S. Non-Final Office Action—U.S. Appl. No. 14/039,722.

"Mercedes-Benz mbrace: Safety & Security Services", Rev. Apr. 9, 2012, Mercedes-Benz, <https://www.mbusa.com/vcm/MB/DigitalAssets/pdfmb/mbrace_Cut_Sheet_A11_4_12_12_.pdf>, 37 pages.

Freeman, Shanna, "How OnStar Works", Feb. 8, 2006, HowStuffWorks.com, <http://auto.howstuffworks.com/onstar.htm>, 12 pages.

"GenieCam", on AngelList by Selka Inc. w/GenieCam website excerpt, Dec. 11, 2012, AngelList <https://angel.co/geniecam>, 6 pages.

"ATX Launches Enhanced Automatic Collision Notification for BMW", TMC News, Jan. 11, 2009, <http://www.tmcnet.com/2009/01/11/3905139.htm>, 2 pages.

Aug. 10, 2017-13 U.S. Office Action—U.S. Appl. No. 14/688,611.

Sep. 7, 2017—U.S. Notice of Allowance—U.S. Appl. No. 14/313,052.

Harding, S.J. (2002), The "Alva Cape" and the Automatic Identification System: The Use of VHF in Collision Avoidance at Sea, The Journal of Navigation, 55(3), pp. 431-442.

Dec. 7, 2017—U.S. Final Office Action—U.S. Appl. No. 14/039,722.

Dec. 28, 2017—U.S. Final Office Action—U.S. Appl. No. 14/688,611.

Jan. 4, 2018—U.S. Final Office Action—U.S. Appl. No. 14/022,552.

Feb. 9, 2018—U.S. Notice of Allowance—U.S. Appl. No. 14/313,052.

May 23, 2018—U.S. Notice of Allowance—U.S. Appl. No. 14/313,052.

Oct. 1, 2019—U.S. Notice of Allowance—U.S. Appl. No. 14/022,552.

Oct. 30, 2019—U.S. Non-Final Office Action—U.S. Appl. No. 14/039,722.

Maciag, A. K. (1980). Motor accident insurance and systems of compensation. (Order No. MK49023, University of Alberta (Canada)). ProQuest Dissertations and Theses, 1. Retrieved from http://search.proquest.com/docview/303097892?accountid=14753. (303097892).

Spevacek, C. E., Ledwith, J. F., Newman, T. R., & Lennes, John B., Jr. (2001). Additional insured and indemnification issues

(56) References Cited

OTHER PUBLICATIONS affecting the insurance industry, coverage counsel, and defense counsel—legal advice and practice pointers. FDCC Quarterly, 52(1), 3-101. Retrieved from http://search.proquest.com/docview/201215466?accountid=14753.

"Using Smartphones to Detect Car Accidents and Provide Situational Awareness to Emergency Responders." Mobile Wireless Middleware, Operating Systems, and Applications, pp. 29-42. Jul. 2010.

"Mercedes-Benz mbrace." Oct. 22, 2010.

"Design and Development of a GSM Based Vehicle Theft Control System and Accident Detection by Wireless Sensor Network." International Journal of Emerging Trends in Engineering and Development, Issue 2, vol. 5, pp. 529-540. Jul. 2012.

"The Potential for Automatic Crash Notification Systems to Reduce Road Fatalities." Annals of Advances in Automotive Medicine, vol. 52, pp. 85-92. 2008. (retrieved from http://www.ncbi.nlm.nih.gov/pmc/articles/PMC3256762/ on Jan. 12, 2013).

"Automatic Crash Response, Car Safety, & Emergency Services—OnStar" retrieved from https://www.onstar.com/web/portal/emergencyexplore?tab=g=1 on Jan. 12, 2013.

"A study of US crash statistics from automated crash notification data." 20th International Technical Conference on the Enhanced Safety of Vehicles Conference (ESV). Lyon, France, pp. 18-21. 2007.

"Insurance Tech Trends 2013" Deloitte, 2013.

"Trends 2013—North American Insurance eBusiness and Channel Strategy." Forrester. May 16, 2013.

"Top 10 Technolgy Trends Impacting Life and PC Insurers in 2013." Gartner. Mar. 27, 2013.

"This App Turns Smartphones Into Safe Driving Tools." Mashable. Aug. 30, 2012. Retrieved from http://mashable.com/2012/08/30/drivescribe-app-safe-driving on Nov. 12, 2013.

"The Automated Collision Notification System." NHTSA. Retrieved from http://www.nhtsa.gov/DOT/NHTSA/NRD/Articles/EDR/PDF/Research/Automated_Collision_Notification_System.pdf on Nov. 12, 2013.

"ACN Field Operational Test—Final Report." NHTSA. Oct. 31, 2000.

"ACN Field Operational Test—Evaluation Report." NHTSA. Feb. 2001.

"Automatic Crash Notification." ComCARE Alliance. Retrieved from http://www.nhtsa.gov/DOT/NHTSA/NRD/Articles/EDR/PDF/Research/ComCARE_ACN_System.pdf on Nov. 12, 2013.

"GEICO App—Android Apps on Google Play." Retreived from https://play.google.com/store/apps/details?id=com.geico.mobile&hl=en on Nov. 12, 2013.

"Privacy Policy." Lemon Wallet. Retrieved from http://lemon.com/privacy; on May 20, 2013.

"Design and implementation of a smart card based healthcare information system." Computer Methods and Programs in Biomedicine 81. pp. 66-78. Sep. 27, 2003.

"Information-Sharing in Out-of-Hospital Disaster Response: The Future Role of Information Technology." Abstracts of Prehospital and Disaster Medicine. Retrieved from http://journals.cambridge.org/action/displayAbstract?fromPage=online&aid=8231246; on May 20, 2013.

"For insurance companies, the day of digital reckoning." Bain & Company. 2013.

"New Idea: QR Codes for License Plates." Feb. 11, 2011. Retrieved from http://www.andrewcmaxwell.com/2011/02/new-idea-qr-codes-for-license-plates on May 21, 2013.

"QR Code." IDL Services. Retrieved from http://www.internationaler-fuehrerschein.com/en/the-idd/qr-code-quick-response-code-feature-in-the-idd.html on May 21, 2013.

"Vehicle Wrap Trends: What are QR Codes and why do I need one?" The Brandtastic Branding & Marketing Education Blog. Retrieved from http://www.sunrisesigns.com/our-blog/bid/34661/Vehicle-Wrap-Trends-What-are-QR-Codes-and-why-do-I-need-one on May 21, 2013.

"Near Field Communication: A Simple Exchange of Information." Samsung. Mar. 5, 2013. Retrieved from http://www.samsung.com/us/article/near-field-communication-a-simple-exchange-of-information on May 21, 2013.

"Microsoft Tag Implementation Guide." Aug. 2010.

"New Technology Security Risks : QR codes and Near Field Communication." Retrieved from http://www.qwiktag.com/index.php/knowledge-base/150-technology-security-risks-qr-codes on Nov. 13, 2013.

"Encrypted QR Codes." qrworld. Nov. 11, 2011. Retrieved from http://qrworld.wordpress.com/2011/11/27/encrypted-qr-codes on Nov. 12, 2013.

"Fraunhofer offers secure NFC keys that can be shared via QR codes." NFC World. Mar. 20, 2013. Retrieved from http://www.nfcworld.com/2013/03/20/323184/fraunhofer-offers-secure-nfc-keys-that-can-be-shared-via-qr-codes on Nov. 13, 2013.

"Automatic License Plate Recognition (ALPR) Scanning Systems." Retrieved from http://www.experiencedcriminallawyers.com/articles/automatic-license-plate-recognition-alpr-scanning-systems on Jun. 28, 2013.

"License plate readers allow police to quickly scan, check for offenders." Mar. 17, 2013. Retrieved from http://cjonline.com/news/2013-03-17/license-plate-readers-allow-police-quickly-scan-check-offenders on Jun. 28, 2013.

"Scan Someone's License Plate and Message Them Instantly with New Bump App." Sep. 17, 2010. Retrieved from http://www.popsci.com/cars/article/2010-09/social-networking-site-uses-license-plates-connect-drivers on Jun. 28, 2013.

"License Plate Scanner Obsoletes Meter Maid." Feb. 1, 2011. Retrieved from http://www.thetruthaboutcars.com/2011/02/license-plate-scanner-obsoletes-meter-maid on Jun. 28, 2013.

"Car insurance firms revving up mobile app features." Feb. 2, 2012. Retrieved from http://www.insurance.com/auto-insurance/auto-insurance-basics/car-insurance-mobile-apps.html on Jun. 28, 2013.

"Bump (application)." Retrieved from http://en.wikipedia.org/wiki/Bump_(application) on Aug. 29, 2013.

Domanico, A., Geico Releases Insurance Glovebox App for Android, Aug. 10, 2010. Retrieved from [http://androidandme.com/2010/08/applications/ geico-releases-insurance-glovebox-app-for-android/].

Sep. 30, 2014—U.S. Office Action—U.S. Appl. No. 14/313,753.
Aug. 12, 2014—U.S. Non-Final Office Action—U.S. Appl. No. 14/022,552.
Jan. 12, 2015—U.S. Amendment and Response to Non-Final Office Action—U.S. Appl. No. 14/022,552.
Mar. 4, 2015—U.S. Final Office Action—U.S. Appl. No. 14/022,552.
Jun. 4, 2015—U.S. —Amendment and Response With Request for Continued Examination—U.S. Appl. No. 14/022,552.
Sep. 11, 2014—U.S. Non-Final Office Action—U.S. Appl. No. 14/029,469.
Feb. 10, 2015—U.S. Amendment and Response to Non-Final Office Action—U.S. Appl. No. 14/029,469.
Mar. 25, 2015—U.S. Final Office Action—U.S. Appl. No. 14/029,469.
Jun. 17, 2015—U.S. Final Office Action—U.S. Appl. No. 14/039,722.
Jun. 17, 2015—U.S. Non-Final Office Action—U.S. Appl. No. 14/313,052.
Jul. 31, 2015—U.S. Non-Final Office Action—U.S. Appl. No. 14/029,469.
Sep. 11, 2015—U.S. Non-Final Office Action—U.S. Appl. No. 14/022,552.
Oct. 27, 2015—U.S. Final Office Action—U.S. Appl. No. 14/313,052.
Feb. 11, 2016—U.S. Final Office Action—U.S. Appl. No. 14/029,469.
Mar. 18, 2019—U.S. Final Office Action—U.S. Appl. No. 14/022,552.
Apr. 26, 2019—U.S. Final Office Action—U.S. Appl. No. 14/039,722.
Apr. 26, 2019—U.S. Notice of Allowance—U.S. Appl. No. 14/688,611.

\* cited by examiner

AUTOMATIC EXCHANGE OF INFORMATION IN RESPONSE TO A COLLISION EVENT

CROSS-REFERENCE TO RELATED APPLICATIONS

The present application is a continuation of co-pending U.S. application Ser. No. 14/313,753, filed Jun. 24, 2014 and entitled "Automatic Exchange of Information In Response to a Collision Event," which is a continuation-in-part of the following patent applications: U.S. patent application Ser. No. 13/791,338 to Brandmaier et al. entitled "Automated Accident Detection, Fault Attribution, and Claims Processing" and filed on Mar. 8, 2013; U.S. patent application Ser. No. 13/791,386 Brandmaier et al. entitled "Automated Accident Detection, Fault Attribution, and Claims Processing" and filed on Mar. 8, 2013; and U.S. patent application Ser. No. 14/039,722 entitled "Electronic Exchange of Insurance Information" and filed on Sep. 27, 2013. Each of the patent applications identified above are incorporated by reference herein in their entirety.

The present application also incorporates by reference each of the following: U.S. patent application Ser. No. 14/022,552 to Tye et al. entitled "Maintaining Current Insurance Information at a Mobile Device" and filed on Sep. 10, 2013; U.S. patent application Ser. No. 14/188,046 to Bryer et al. entitled "Providing Rewards Based on Driving Behaviors Detected by a Mobile Computing Device" and filed on Feb. 24, 2014; and U.S. patent application Ser. No. 14/211,186 to Bryer et al. entitled "Providing Rewards Based on Driving Behaviors Detected by a Mobile Computing Device" and filed on Mar. 14, 2014.

BACKGROUND

Drivers often keep respective hardcopies of their insurance information in their vehicles in case a vehicle incident such as a collision occurs. Following a vehicle incident, a driver may exchange insurance and contact information with another driver. Typically, drivers involved in a vehicle incident may use paper and pen to exchange insurance information. This paper and pen approach is also often employed to leave behind insurance information when a driver damages an unoccupied vehicle or other unattended property. In some circumstances, drivers may attempt to exchange insurance information by taking photos of the respective insurance cards.

Papers containing insurance information, however, are easily lost and damaged. Additionally, paper and pen may not be available or readily accessible in some situations. Furthermore drivers may be embarrassed or upset following a collision event, and confronting other drivers to exchange insurance information may be additionally distressing. Moreover, depending on the severity of the vehicle incident, a driver may be rattled to the point that copying insurance information via paper and pen or taking a photograph of an insurance card is prohibitively difficult. Therefore, a need exists for improved approaches to sharing and exchanging insurance information between individuals.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect described herein provides a computer-implemented method of exchanging insurance information. A wireless communication device may collect telematics data related to operation of a vehicle. The wireless communication device may detect the occurrence of a collision event involving the vehicle based on the telematics data collected. The wireless communication device may discover another wireless communication device locating in the vicinity of the collision event that has also detected a collision event. The wireless device may initiate an exchange of insurance information with that other wireless communication device.

A second aspect described herein provides a wireless computing device. The wireless computing device includes at least one processor, a telematics device, and memory storing computer-readable instructions. The telematics device may be configured to, in operation, collect telematics data related to operation of a vehicle. The instructions, when executed by the at least one processor, may cause the wireless communication device to detect a collision event based on the telematics data collected. The instructions, when executed, may also cause the wireless communication device to discover another wireless communication device within the vicinity of the collision event that has also detected a collision event. The instructions, when executed, may further cause the wireless communication device to initiate an exchange of insurance information with the that other wireless communication device.

The details of these and other embodiments of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated that one or more components illustrated in the accompanying figures may be positioned in other than the disclosed arrangement and that one or more of the components illustrated may be optional.

DETAILED DESCRIPTION

Figure 1:
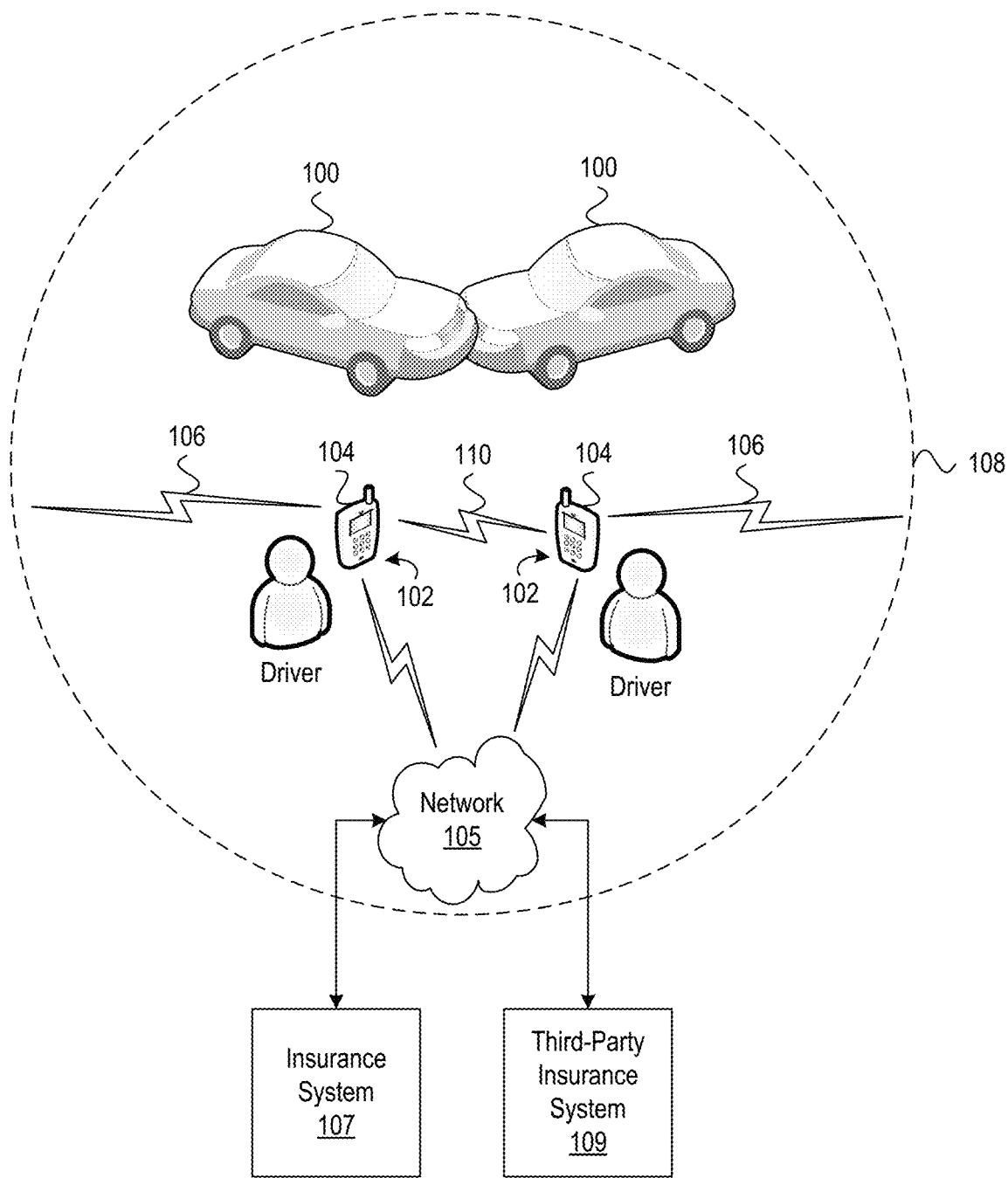
FIG. 1 is an illustration of an example scenario in which insurance information may be automatically exchanged between wireless communication devices.

Commonly-owned U.S. patent application Ser. No. 13/791,338 to Brandmaier et al. and commonly-owned U.S. patent application Ser. No. 13/791,386 to Brandmaier et al.—each of which are incorporated by reference herein—describe, inter alia, techniques for collecting telematics data relating to the operation of a vehicle, detecting vehicle collision events, and automatically providing insurance information to participants involved in vehicle collisions. In addition, commonly-owned U.S. patent application Ser. No. 14/039,722 to Brandmaier et al.—also incorporated by reference herein—describes, inter alia, techniques for electronically exchanging insurance information using mobile computing devices.

Aspects of the present disclosure expand on the teachings of these commonly-owned applications and describe additional techniques for the automated exchange of insurance information in response to a collision event. In general, telematics data may be collected during the operation of a vehicle and analyzed to detect when a collision event has occurred. In response to detecting a collision event, a wireless communication device ("wireless device") may attempt to discover other wireless devices nearby that have also detected or otherwise received notification of a detected collision. If such a wireless device is discovered, an exchange of insurance information between the wireless devices may be initiated. Additional aspects will be appreciated with the benefit of the disclosures provided below.

The techniques for automatically exchanging insurance information described herein provide various advantages over the traditional pen-and-paper method of exchanging insurance information. Following a collision, drivers may be understandably embarrassed or upset. An automatic exchange of insurance information advantageously allows drivers to avoid leaving their vehicle and confronting the other driver. An automatic exchange of insurance information may also advantageously reduce the likelihood that a participant leaves the scene of a collision without providing or receiving the insurance information of the other driver. An automatic exchange of insurance information further advantageously facilitates the claims process by quickly and efficiently providing an insurance provider with the insurance information of the other drivers involved in the collision in the first notice of loss. Additional advantages will be appreciated with the benefit of disclosures provided in more detail below.

As used throughout the description, various terms may be used to refer to the entities and components involved or associated with automatically exchanging insurance information in response to a collision event. A participant in this context is an individual whose vehicle was involved in a collision. A participant may or may not be a customer of an insurance provider that provides insurance coverage. In some instances, participants may be customers of the same insurance provider while in other instances the participants may be customers of different insurance providers. An insurance provider may be referred to as an insurer, and a customer of the insurer may be referred to as an insured. The insurer may provide and operate an insurance system that stores information describing the insurance policies purchased by the insurance customers. Information related to and describing insurance policies is referred to in this description as insurance information. Insurance information may include, for example, the name of the insurance provider, an insurance customer number, the name of the insured, an insurance policy number, effective dates, and other types of insurance-related information that will be appreciated by those skilled in the art of providing insurance services. Where participants are insured by different insurance providers, one of those insurance providers may be referred to, for convenience, as a third-party insurance provider, e.g., a third-party insurer. The third-party insurer may operate a third-party insurance system that also stores information describing the insurance policies purchased by the insurance customers. Moreover collision events refer, for convenience, to events in which two moving vehicle collide with one another as well as events in which a moving vehicle allides with a stationary vehicle, e.g., a vehicle stopped at a traffic signal.

Figure 2:
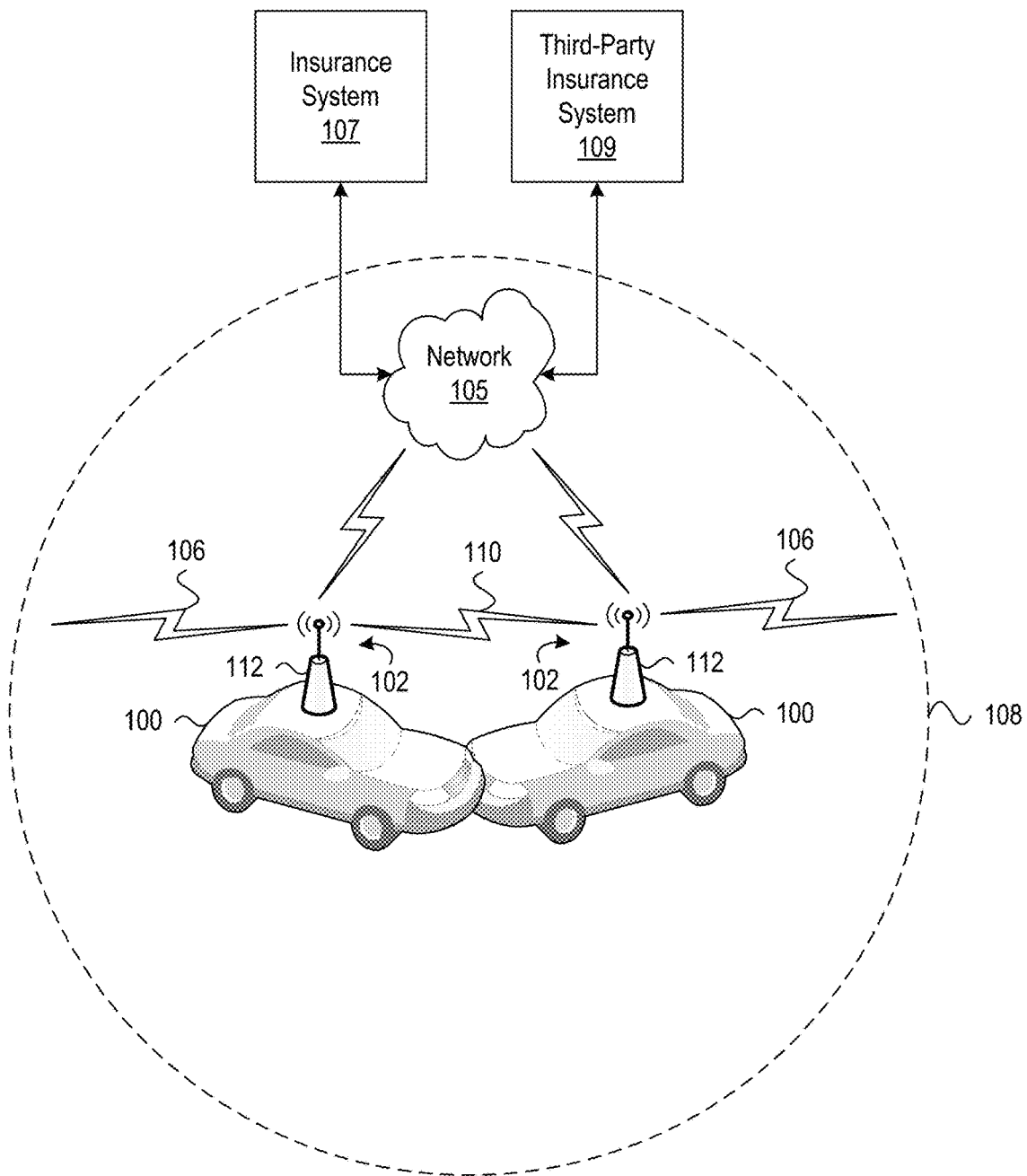
FIG. 2 is an illustration of another example scenario in which insurance information may be automatically exchanged between wireless communication devices.
Figure 3:
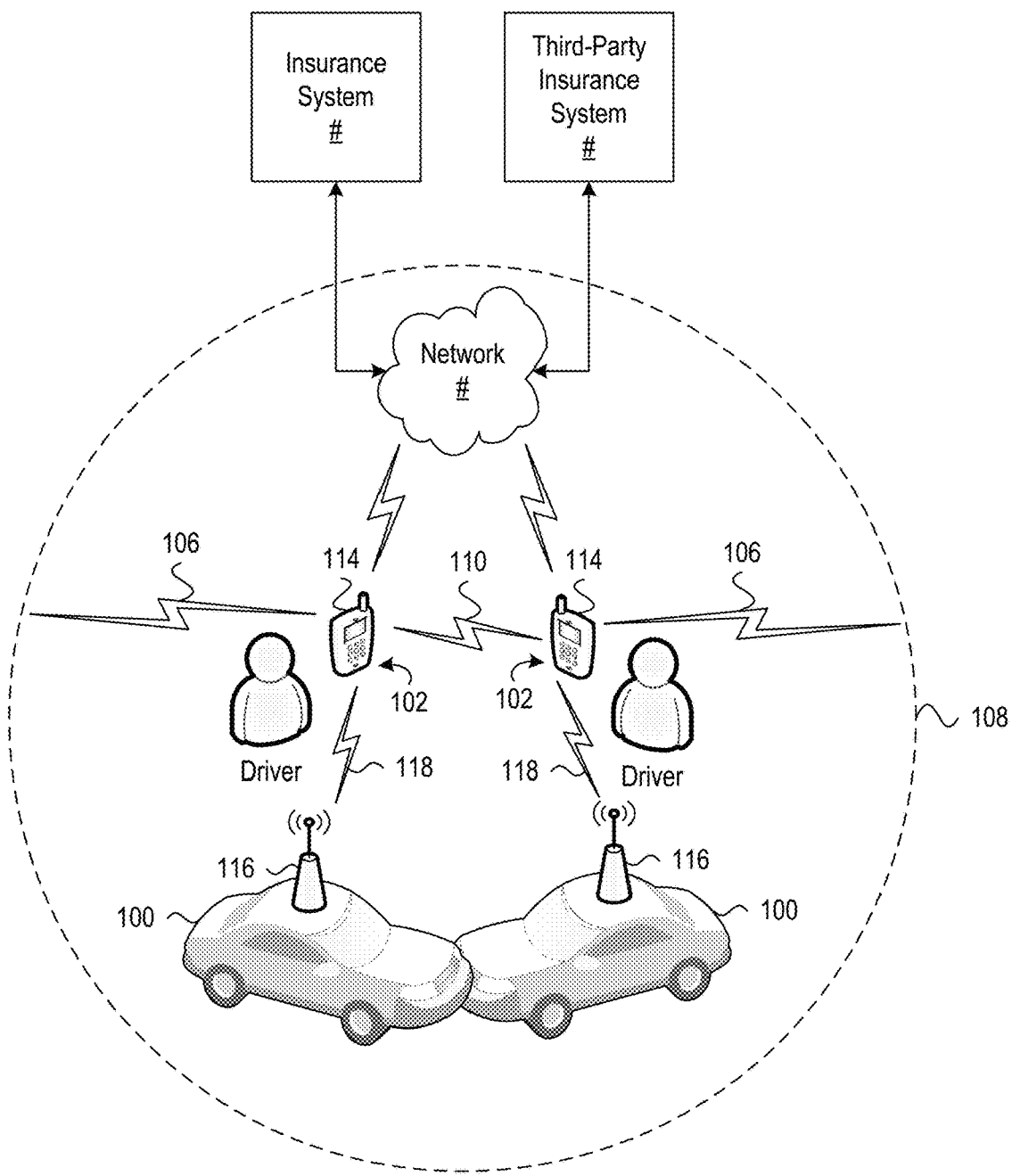
FIG. 3 is an illustration of a further example scenario in which insurance information may be automatically exchanged between wireless communication devices.

FIGS. 1-3 illustrate example scenarios in which insurance information may be automatically exchanged between wireless devices. In FIG. 1, a collision between two vehicles 100 is illustrated. The wireless devices 102 that initiate the exchange of insurance information in FIG. 1 are the personal mobile computing devices 104 of the drivers involved in the collision. A mobile computing device 104 may be, for example, a mobile cellular telephone, a tablet computer, a palmtop computer, and other types of mobile computing devices that will be appreciated by those skilled in the art. The mobile computing devices 104, in this example, are configured to collect telematics data during operation of the vehicles 100 and configured to analyze the telematics data to detect when a collision event occurs. In response to a collision event, the mobile computing devices 104 broadcast wireless communications 106 ("communications") throughout the vicinity 108 of the collision event in order to locate other wireless devices that have also detected a collision event in the vicinity of the collision event. Upon discovering another wireless device within the vicinity 108 that have also detected a collision event, the wireless computing devices 102 may initiate a wireless communication session with that wireless device. As shown by way of example in FIG. 1, the mobile computing devices 104 have established a wireless communication session during which wireless communications 110 are exchanged. The communications 110 may include respective insurance information for the drivers involved in the collision. Due to the communications 110 exchanged between the mobile computing devices, the drivers may be able to exchange their respective insurance information without leaving their vehicles.

The wireless devices 102 may also be in signal communication with one or more insurance systems via a network 105. The insurance systems may include an insurance system 107 operated by an insurance provider that insures one of the drivers as well as a third-party insurance system 109 operated by a third-party insurance provider that insures the other driver. As described in further detail below, the communications 110 exchange between the wireless devices 102 may include communications indicating how each wireless device may contact the insurance system 107 or the third-party insurance system 109. The network 105 may include one or more wired or wireless networks such as a cellular network, a wireless local area network, and the Internet.

In FIG. 2, another collision between two vehicles 100 is illustrated. The wireless devices 102 that initiate the exchange of insurance information in FIG. 2, however, are in-vehicle devices 112, i.e., devices attached to or installed in the vehicles 100 themselves. The in-vehicle devices 112 may, for example, be configured to attach to an OBD-II port of a vehicle 100 and receive diagnostic information from the vehicle. An in-vehicle device 112 may also be installed in a vehicle 100 as a component of the vehicle. Like the mobile computing devices 104 of FIG. 1, the in-vehicle devices 112 are configured to collect telematics data during operation the vehicles 100 and configured to analyze the telematics data to detect when a collision occurs. The in-vehicle devices 112 are also configured to broadcast communications 106 throughout the vicinity 108 of the collision event in response to a collision event in order to locate other wireless devices within the vicinity 108 that have also detected a collision event. The in-vehicle devices 112 may likewise initiate a wireless communication session with a wireless device discovered within the vicinity 108 of the collision event that has also detected a collision event. As shown by way of example in FIG. 2, the in-vehicle devices 112 have established a wireless communication session during which communications 110 are exchanged. As noted above, the communications 110 may include the respective insurance information for the drivers involved in the collision.

In FIG. 3, a further collision between two vehicles 100 is illustrated. In the configurations shown in FIG. 3, however, the functionality for detecting a collision event and initiating an exchange of insurance information is split across multiple devices. In this example, the wireless computing devices 102 that initiate the exchange of insurance information are the personal mobile computing devices 114 of the drivers involved in the collision. In contrast to the example implementation illustrated in FIG. 1, however, in-vehicle devices 116 are configured to collect and analyze telematics data during operation of the vehicles 100 in order to detect a collision event. The mobile computing devices 114 and the in-vehicle devices 116 may be in signal communication with each other and exchange wireless communications 118. Upon detecting a collision event, an in-vehicle device 116 may transmit a communication 118 to a mobile computing device 114 as a collision notification. In response to receipt of a collision notification from the in-vehicle device 116, the mobile computing device 114 may broadcast communications 106 throughout the vicinity 108 of the collision event as described above. As shown by way of example in FIG. 3, the mobile computing devices 114 have each received a collision notification in respective communications 118 from the in-vehicle devices 116. As also shown in FIG. 3, the mobile computing devices 114 have established a communication session to exchange communications 110 that include respective insurance information for the drivers of the vehicles 100.

It will be appreciated that the scenarios illustrated in FIGS. 1-3 are provided by way of example only. Additional and alternative scenarios will be appreciated with the benefit of this disclosure. In one alternative example, the wireless computing devices that exchange communications during a wireless communication session may include the personal mobile computing device of one of the drivers and an in-vehicle device at the vehicle of another one of the drivers. Furthermore, although only two wireless devices are shown in FIGS. 1-3, it will be appreciated that a wireless device may discover multiple wireless devices that are located within the vicinity of the collision event and that have also detected a collision event. In such scenarios, the wireless devices may establish a wireless ad hoc communication network. The wireless ad hoc communication network may function as a mesh network to exchange insurance information among each of the wireless devices.

It will also be appreciated that additional types of information may be exchanged between wireless devices during a wireless communication session. The communications 110 may include, for example, the telematics data collected at the mobile computing devices 104 of FIG. 1, the in-vehicle devices 112 of FIG. 2, or the in-vehicle devices 116 of FIG. 3. The in-vehicle devices 116 of FIG. 3 may transmit the collected telematics data to the mobile computing devices 114 via the communications 118. The wireless devices may, in turn, provide the telematics data to an insurance system for fault determination or claims processing. Techniques for fault determination and claims processing using collected telematics data are described in commonly-owned U.S. patent application Ser. No. 13/791,338 to Brandmaier et al. and commonly-owned U.S. patent application Ser. No. 13/791,386 to Brandmaier et al., incorporated by reference herein.

Figure 4A:
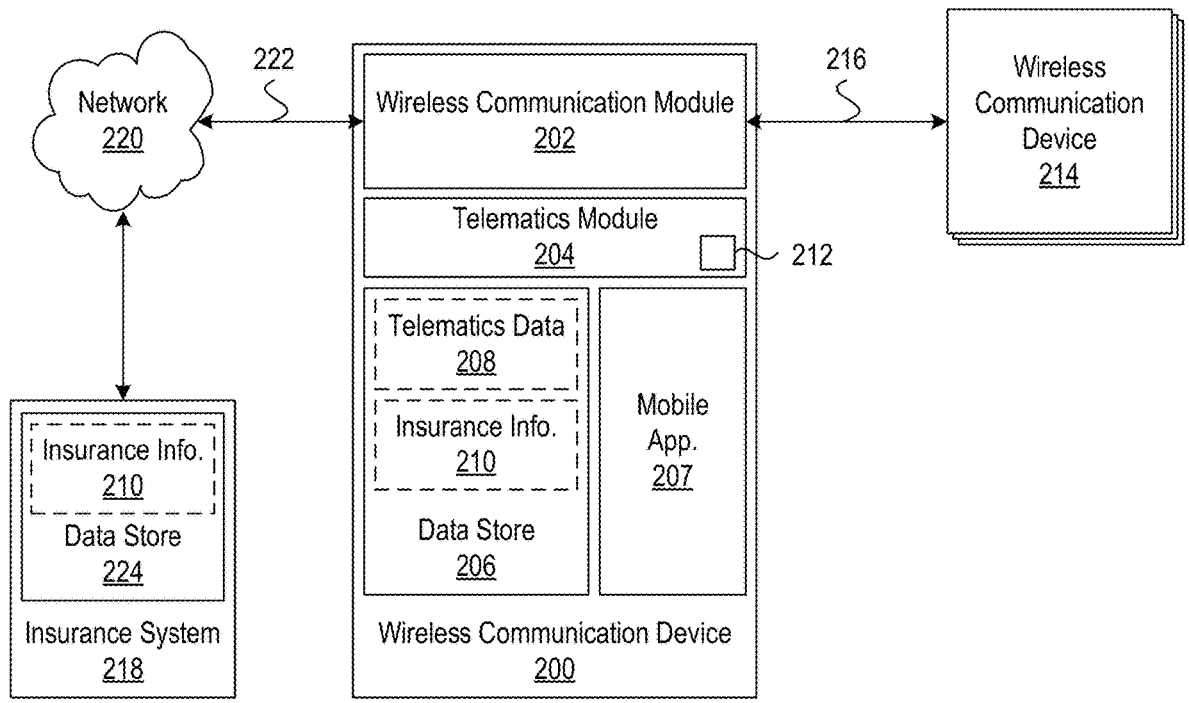
FIG. 4A is a block diagram of an example of an implementation of a wireless communication device configured to automatically exchange insurance information with another wireless communication device.
Figure 4B:
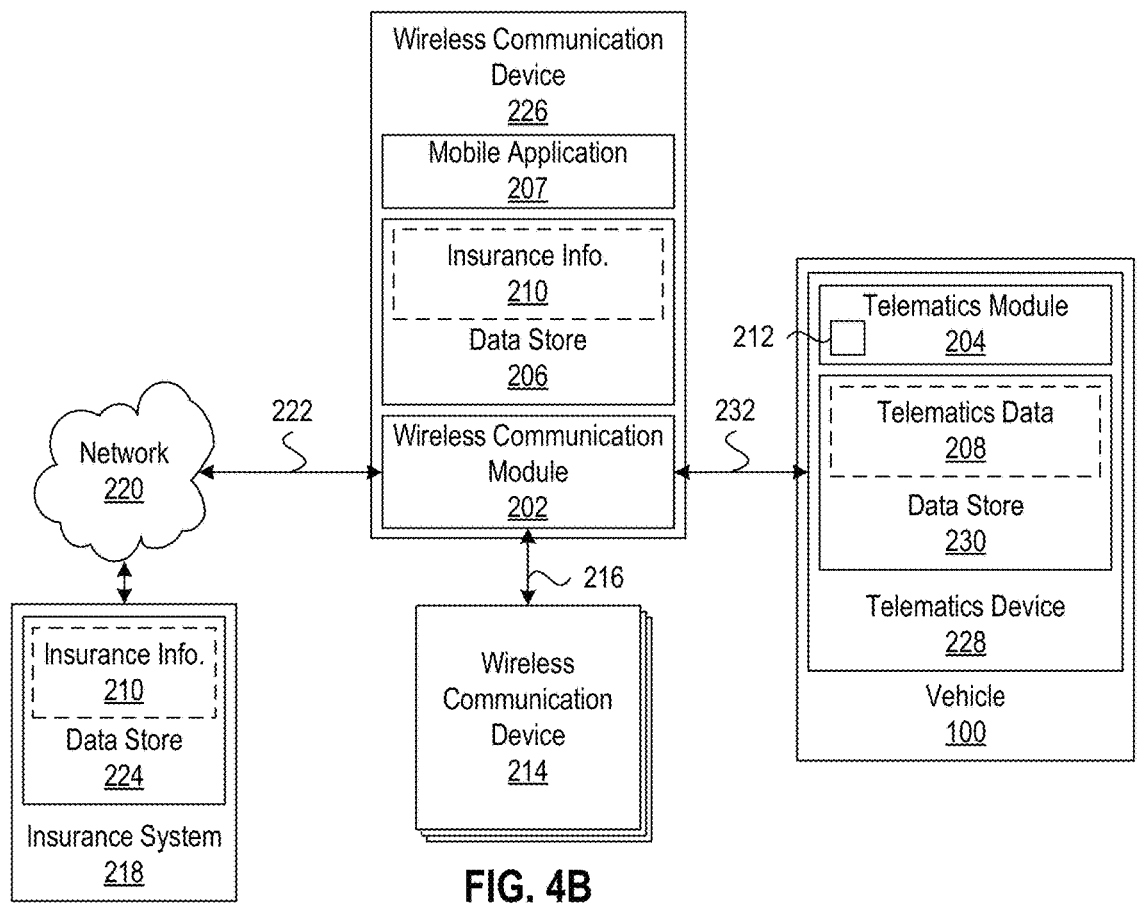
FIG. 4B is a block diagram of another example of an implementation of a wireless communication device configured to automatically exchange insurance information with another wireless communication device.

Referring now to FIGS. 4A-B, two respective examples of implementations of wireless communication devices configured to automatically exchange insurance information in response to a collision event are shown. FIG. 4A illustrates a block diagram of one example of an implementation of a wireless communication device 200 that is configured to automatically initiate an exchange of insurance information in response to detection of a collision event. The wireless device 200, in this example, includes a wireless communication module 202, a telematics module 204, a data store 206, and a mobile application 207. The data store 206, in this example, stores telematics data 208 collected by the telematics device 204 as well as insurance information 210. As described above, the insurance information 210 may include information that identifies an insurance customer and describes various aspects of an insurance policy purchased by the insurance customer.

The telematics module 204 may include hardware such as an accelerometer 212, software, firmware, or a combination of such. The telematics module 204 may be configured to collect the telematics data 208 during operation of a vehicle and provide the telematics data to the data store 206 for storage. The telematics module 204 may also be configured to analyze the telematics data 208 collected in order to detect collision events involving the vehicle. As the telematics module 204 may include an accelerometer 212, the telematics data 208 may thus include acceleration data generated by the accelerometer during operation of the vehicle. The telematics module 204 may analyze the acceleration data (e.g., at software or firmware) to determine whether a collision has occurred. The telematics module 204 may determine that a collision has occurred based on an observed change in acceleration, e.g., a rapid acceleration or a rapid deceleration. In some example implementations, the telematics module 204 may determine that a collision has occurred upon observing a change in velocity of around 8.0 kilometers per hour occurs within an interval of around 150 milliseconds, i.e., a change in velocity of around 4.97 miles per hour within an interval of around 0.15 seconds.

The telematics data 208 may also include positioning data generated by a positioning device (not shown) of the wireless device 200. The positioning device may be, e.g., a GPS (Global Positioning System) module, and the positioning data may be GPS data generated by the GPS module during operation of the vehicle. The telematics module 204 may be in signal communication with the GPS module and collect and analyze the GPS data generated. Accordingly a collision event may additionally or alternatively be based on an analysis of the GPS data. The GPS data may include, e.g., the speed of the vehicle. Accordingly the telematics module 204 may determine that a collision has occurred in response to a change in vehicle speed that correlates with a collision event.

Commonly-owned U.S. patent application Ser. No. 13/791,338 to Brandmaier et al. and commonly-owned U.S. patent application Ser. No. 13/791,386 (each incorporated by reference) describe additional techniques for collecting telematics data during operation of a vehicle and detecting vehicle collision events. In addition, commonly-owned U.S. patent application Ser. No. 14/188,046 to Bryer et al. and commonly-owned U.S. patent application Ser. No. 14/211,186 to Bryer et al. (each also incorporated by reference) describe particular techniques for collecting telematics data at mobile computing devices.

The mobile application 207 of the wireless device 200 may be configured facilitate various aspects associated with collecting telematics data during operation of a vehicle, analyzing telematics data to detect collision events, and exchanging information with other wireless communication devices in response to collision events. An insurance company may provide the mobile application 207 to a mobile application distribution platform for delivery and installation at the wireless device 200.

The mobile application 207 may be in signal communication with the telematics module 204. In some example implementations, the mobile application 207 may instruct the telematics module 204 to start collecting the telematics data 208. In other example implementations, the mobile application 207 may instruct the telematics module to detect when movement of a vehicle has begun and start collecting the telematics data 208 in response. The mobile application 207 may be configured to instruct the telematics module 204 in response to user input received at the wireless device 200. The telematics module 204 may automatically initiate collection of the telematics data in response to detecting movement that correlates with movement of a vehicle, e.g., a relatively large change in detected acceleration based on the acceleration data generated by the accelerometer 212. The telematics module 204 may inform the mobile application 207 when collection of the telematics data 208 has started and stopped. As noted above, the telematics module 204 may be configured to analyze the telematics data 208 to detect collision events. Accordingly the telematics module 204 may also provide the mobile application 207 a collision notification in response to detecting a collision event based on an analysis of the telematics data 208.

In some example implementations, however, the telematics module 204 may simply collect the telematics data 208, and the mobile application 207 may be configured to analyze the telematics data to detect collision events. In some example implementations, the telematics module 204 may be a component or sub-module of the mobile application 207 and in signal communication with components of a wireless device such as an accelerometer.

The mobile application 207 may also provide a user interface that indicates a current mode at the wireless device 200. Modes may include: a telematics data collection mode; a device discovery mode in which the wireless device 200 polls for other wireless devices in the vicinity of a collision event that have also detected a collision event; a handshake mode in which the wireless device establishes a wireless communication session with another wireless device; and an information exchange mode in which the wireless devices exchange information, e.g., insurance information and telematics data. These examples modes will be discussed in further detail below. The interface may also present visual or audible notifications that another wireless device has been discovered, that a wireless communication session has been established, that information has been received from the other wireless device, and that information has been delivered to the other wireless device.

As described in further detail below, the wireless device 200 may activate a device discovery mode in response to detecting a collision event. The wireless device 200 may activate the discovery mode to discover other wireless devices in the vicinity of the collision event that have also detected a collision event. When the device discovery mode is active, the wireless device 200 broadcasts wireless communications and listening for wireless communications broadcast in the vicinity of the collision event. The communications broadcast by the wireless device 200 may announce that the wireless device has detected a collision event. The wireless device 200 may include in the communications broadcast a timestamp indicating the date and time the collision was detected.

Other wireless devices configured with the same functionality as wireless device 200 may be located within the vicinity of the collision event, e.g., wireless communication devices 214. Accordingly those other wireless communication devices 214 may also initiate a device discovery mode in response to detecting a collision event, broadcasting wireless communications announcing detection of the collision event and listening for wireless communications broadcast in the vicinity of the collision event. In response to receipt during the device discovery mode of a wireless communication announcing the detection of a collision event, the wireless devices 200 and 214 may initiate a handshake procedure to establish a wireless communication session. The handshake procedure may include broadcasting and receiving synchronize requests and acknowledgements. Additional details with respect to implementing the handshake procedure will be appreciated by those skilled in the art of telecommunications. Furthermore discovering other wireless devices in the vicinity of a collision event and establishing a wireless communication session between devices may be referred to as pairing those wireless devices.

The wireless communication module 202 may be configured to send and receive the wireless communications. In addition the wireless communication module 202 may include multiple sub-modules for handling various types of wireless communications. As shown in FIG. 4A, for example, the wireless device 200 is in signal communication with another wireless communication device 214 which may be located in the vicinity of a collision event. Accordingly one of the sub-modules of the wireless communication module 202 may be configured for exchanging wireless communications 216 with the wireless device 214. As noted above, the communications 216 may include insurance information, telematics data, and other types of information that will be appreciated with the benefit of this disclosure.

As noted above, the wireless device 200 is configured to broadcast wireless communications within the vicinity of a collision event. As used in this description, the vicinity of a collision event refers to an area surrounding the vehicle defined by the useful range of wireless communications broadcast by a short-range device, e.g., a wireless device having an effective radiated power (ERP) of around 25 milliwatts to around 100 milliwatts (mw). Those skilled in the art of telecommunications will appreciate that an area defined by the useful range of wireless communications broadcast by a wireless communication module having an ERP of around 25-100 mw would have an approximate diameter of a few hundred meters. Due to the relatively short range of the wireless communications 216, the wireless communications sessions and ad hoc networks established by the wireless devices 200 and 214 may be akin to "near me" area networks (NANs) or personal area networks (PANs).

Accordingly any wireless communication standards suitable for broadcasting wireless communications in the vicinity of the collision event may be selectively employed. Such standards may include those that operate in the 2.4 GHz ISM radio band or the 5 GHz U-NIII radio band. Some example of wireless standards that may be selectively employed include Wi-Fi (e.g., the IEEE 802.11 or 802.15 standard), Wi-Fi Direct, Bluetooth, ZigBee, Wireless USB, Z-Wave, and other standards for wireless communication that will be appreciated by those skilled in the art of telecommunications.

The wireless communications 216 exchanged between the devices 200 and 214 in the vicinity of the collision event may include various types of information. As described in further detail below, the communications 216 may include wireless communications announcing that the devices 200 and 214 have detected a collision event. Upon receiving a communication 216 announcing detection of a collision event, the devices 200 and 214 may then exchange communications 216 during a perform a handshake procedure to establish a wireless communication session.

The communications 216 exchanged during the session may include insurance information, telematics information, and other types of information as described above. Various formats for the information exchanged may be selectively employed. In some example implementations the information and data may be transmitted as a delimited list of values or as a set of values annotated using a mark-up language (e.g., XML). Various file formats may also be employed. In some example implementations, the information may be transmitted as raw text, in a document file (e.g., .txt, .doc, .pdf) or in an image file (e.g., .gif, .jpg, .png).

As also shown in FIG. 4A, the wireless device 200 is in signal communication with an insurance system 218 via a network 220. The network 220 may include a wireless cellular network, and the wireless communications 222 exchanged with the insurance system 218 may thus include wireless cellular communications. Accordingly one of the sub-modules of the wireless communication module 202 may be configured for sending and receiving wireless cellular communications, e.g., where the wireless device 200 is a mobile cellular telephone.

The insurance system 218 may include a data store 224 that stores the insurance information 210 as described above. In some example implementations, the data store 224 of the insurance system 218 may permanently store the insurance information 210 and the data store 206 of the wireless computing device 200 may temporarily store the insurance information 210 for the purposes of exchanging insurance information with another wireless device 214. In these example implementations, the wireless device 200 may submit a request to the insurance system 218 for the insurance information associated with an operator of the wireless device. In response to the request, the insurance system 218 may retrieve the insurance information from the data store 224 and provide it to the wireless device 200. The communications 222 may respectively include the request sent to the insurance system 218 and the insurance information 210 sent back to the wireless device 200 in response. The request may include a unique identifier (e.g., a customer number, insurance policy number) that the insurance system 218 utilizes to retrieve the appropriate insurance information 210.

In other example implementations, both the wireless device 200 and the insurance system 218 may permanently store the insurance information 210. In these other example implementations, the wireless device 200 may receive the most up-to-date insurance information from the insurance system 218. The wireless device 200 may periodically request whether new insurance information is available from the insurance system 218. Additionally or alternatively the insurance system may push new insurance information to the wireless device 200 when it becomes available at the insurance system. Techniques for maintaining up-to-date insurance information are described in commonly-owned U.S. patent application Ser. No. 14/022,552 to Tye et al., incorporated by reference.

The communications 222 from the wireless device 200 to the insurance system 218 may also include the telematics data 208 collected by the telematics module 204 as well as insurance information and telematics data received from another wireless device 214 during a wireless communication session. A wireless communication 222 notifying the insurance system 218 that a collision event has been detected may represent the first notice of loss to the insurance provider that operates the insurance system. In response to receipt of a wireless communication 222 that includes a collision notification, the insurance system 218 may, e.g., create a placeholder insurance claim in response. The insurance system 218 may also pre-populate the placeholder insurance claim with customer information and insurance information stored at the insurance system or received from the wireless device 200. The insurance provider may thus leverage the pre-populated insurance claim should the participant subsequently file a claim for the collision event. The insurance provider may utilize the telematics data 208 received during claims processing, e.g., to determine which participant was at fault, to determine an order for the collision events (e.g., based on the timestamps of collision notifications received), and perform other types of analyses on the telematics data that will be appreciated by those skilled in the art of insurance claims processing. The insurance policy that insures the participant may authorize the insurance provider to utilize the telematics data 208 received during subsequent claims processing.

As noted above, the insurance system 218 may be operated by an insurance provider that insures the participant associated with the wireless communication device 200. Alternatively the insurance system 218 may be a third-party insurance system that insures the other participant in the collision event. In this alternative scenario, the communications 216 exchanged between the wireless devices 200 and 214 may include respective contact information for each of the insurance providers. Accordingly the wireless communications 222 from the wireless device 200 may include communications to a third-party insurance provider to notify that insurance provider of the collision event and provider the insurance information 210 for the participant associated with the wireless device 200.

Referring now to FIG. 4B, another example of an implementation of a wireless communication device 226 is shown. In FIG. 4B, the functionality associated with collecting the telematics data 208 and exchanging the insurance information 210 is distributed across multiple devices as described above with reference to FIG. 3. As seen in FIG. 4B, a wireless communication device 226 is in signal communication with a telematics device 228 installed at or attached to a vehicle 100. The telematics device 228, in this example, includes the telematics module 204 as well as a data store 230 that stores the telematics data 208 collected by the telematics module. The telematics module 204 of FIG. 4B likewise includes an accelerometer 212 that generates acceleration data during operation of the vehicle which is stored at the data store 230 as the telematics data 208. The telematics device 228 may be configured to initiate collection of the telematics data 208 in response to ignition of the vehicle 100. Techniques for collecting telematics data at a device installed at or attached to a vehicle are described in commonly-owned U.S. patent application Ser. No. 13/791,338 and U.S. patent application Ser. No. 13/791,386, each of which are incorporated by reference.

As noted above, the wireless device 226 and the telematics device 228 may be in signal communication with each other via wireless communications 232. The communications 232 may include wireless communications that establish a communication session during a handshake procedure. The communications 232 may also include wireless communications to provide the telematics data 208 from the telematics device 228 to the wireless device 226. The wireless device 226 may similarly include a mobile application 207 as described above. The mobile application 207 in FIG. 4B, however, may be in signal communication with the wireless communication module 202 to exchange the communications 232 with the telematics device 228. The wireless device 226 may also establish a wireless communication session with wireless communication devices 214 discovered during a device discovery mode following detection of a collision event. As described above, the wireless devices 226 and 214 may exchange communications 216 to establish the wireless communication session and exchange information such as insurance information and telematics data.

Like the wireless device 200 of FIG. 4A, the wireless device 226 may also be in signal communication with an insurance system 218 via a network 220, e.g., a cellular network. Wireless communications 222 exchanged between the wireless device 226 and the insurance system may likewise include: communications to transmit telematics data 208 collected by the telematics device 228 or telematics data received from another wireless device 214; communications to request and receive insurance information 210 from the insurance system 218; and other types of communications that will be appreciated with the benefit of this disclosure.

In an alternative implementation similar to that of FIG. 4B, the data store 230 of the telematics device 228 may also store the insurance information 210. In this alternative example, the wireless device 226 and the telematics device 228 may perform a handshake procedure to pair with each other and establish a wireless communication session. The wireless device 226 and the telematics device 228 may perform the handshake procedure, e.g., in response to ignition of the vehicle where the telematics device polls for nearby devices. Once paired the wireless device 226 may transmit the insurance information 210 to the telematics device 228 via the communication session. The telematics device 228 may store the insurance information 210 received at the data store 230. In this way, the insurance information 210 shared in response to a collision event may be insurance information for an insurance policies that insure the individual drivers rather than insurance policies that insure the vehicle. In some example implementations, the telematics device 228 may clear the data store 230 of any telematics data 208 and insurance information 210 when the vehicle is shut off.

Figure 4C:
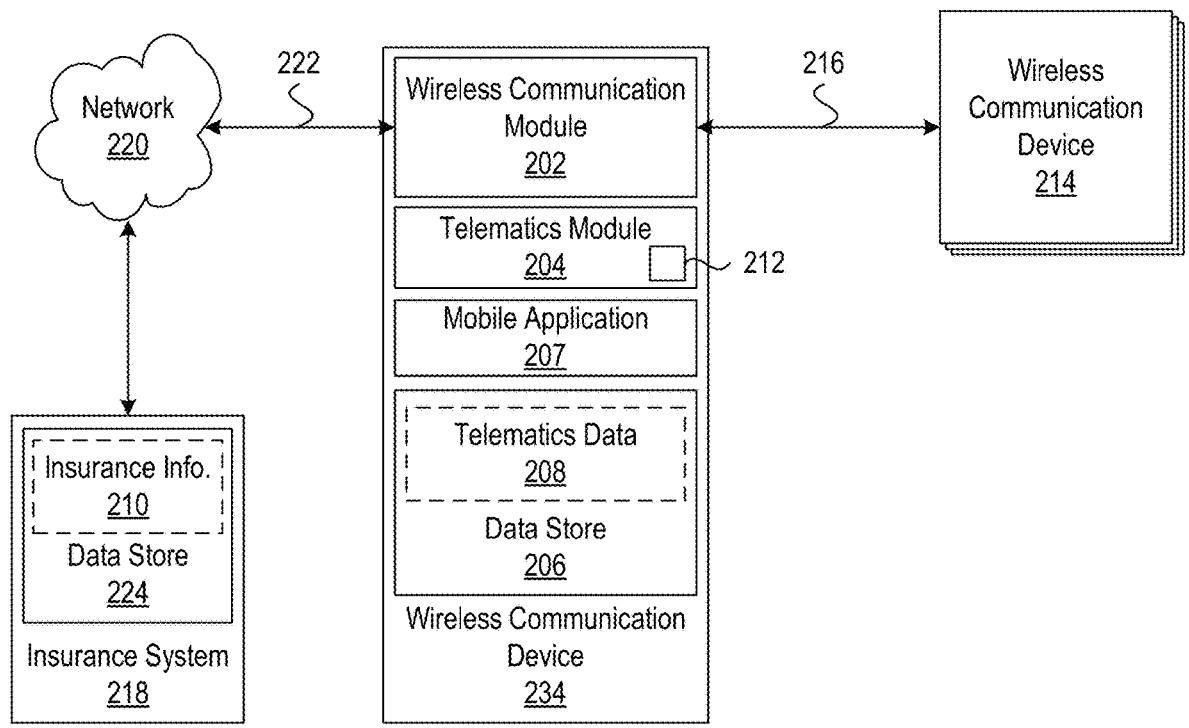
FIG. 4C is a block diagram of a further example of an implementation of a wireless communication device configured to automatically exchange insurance information with another wireless communication device.

With reference now to FIG. 4C, a further example of an implementation of a wireless computing device 234 is shown. As seen in FIG. 4C, the wireless communication device 234, in this example, includes a wireless communication module 202, a telematics module 204, a data store 206, and a mobile application 207. The wireless communication module 202, telematics module 204, and data store 206 may have functionality similar to that described above with reference to FIG. 4A. The data store 206 may store the telematics data 208, and the telematics module 204 may include an accelerometer that collects acceleration data to be stored as telematics data. Furthermore the wireless device 234 may establish a wireless communication session with one or more wireless devices 214 in the vicinity of a collision event and exchange wireless communications 216 as described above.

In the example implantation shown in FIG. 4C, however, the wireless device 234 does not store the insurance information 210. Instead the insurance information 210, in this example, is only stored at the data store 224 of the insurance system 218. The wireless device 234, in this example, initiates the exchange of insurance information with another wireless device 214 by requesting that the insurance system 218 transmit the insurance information 210 to the wireless device 214 (e.g., as a text message) or to another location associated with that wireless device (e.g., an email address of the operator of that wireless device). The wireless device 234 may submit the request to the insurance system 218 in one of the communications 222 to the insurance system.

In this example, the communications 216 exchanged between the wireless devices 234 and 214 during a wireless communication session may include contact information or identification information that may be utilized to lookup contact information. Contact information may include, for example, a mobile telephone number for a wireless device or an email address for the operator of the wireless device. In response to receipt of contact information from the wireless device 214, the wireless device 234 may forward the contact information to the insurance system 218 in one of the wireless communications 222. The wireless device 234 may, for example, include the contact information received from the wireless device 214 in the request submitted to the insurance system 218. In response to receipt of the request and the contact information, the insurance system 218 may retrieve the insurance information 210 and provide it to the wireless device 214 or to another location associated with the wireless device. Where the contact information is a mobile telephone number, the insurance system 218 may provide the insurance information 210 to the wireless device 214 as, e.g., a text message, an automated voice message, or other type of message that utilizes a mobile phone number to reach wireless devices. Where the contact information is an email address, the insurance system 218 may provide the insurance information 210 in an email to that email address. Additional and alternative types of contact information may be selectively employed, e.g., screennames for chat programs where the insurance information 210 is provided in a chat message to the screenname provided.

Identification information may include any type of information that uniquely identifies the operator of a wireless device such as wireless devices 234 and 214. Accordingly, identification information may include, e.g., an insurance customer number, an insurance policy number, and other types of unique identifiers that will be appreciated by those skilled in the art. It will be appreciated that a mobile telephone number may also be utilized to determine the identity of the operator and may thus also be considered as identification information.

The insurance system 218 may utilize identification information to determine the identity of an individual associated with that information as well as contact information for that individual. The insurance system 218 may, for example, perform a lookup in a customer database using the identification information received. The customer database may store customer records that may be retrieved using the identification information received. The customer records may include contact information (e.g., a mobile telephone number, email address, etc.) for the insurance customer. If the insurance system 218 locates a matching customer record, then the insurance system may provide the insurance information 210 using the corresponding contact information as described above.

As noted above participants in a collision event may be insured by different insurance providers. Therefore the insurance system 218 may not store customer records for individuals insured by other insurance providers. The insurance system 218, however, may be in signal communication with the insurance systems of other insurance providers and configured to query other insurance providers if a matching customer record cannot be found using the identification information provided. The query to the insurance system of a third-party insurance provider may include the identification information received from the wireless device 234. In some example implementations, the third-party insurance system may respond to the insurance system 218 with the contact information associated with the identification information if a matching customer record is located at a customer database of the third-party insurance system. In other example implementations, the query to the third-party insurance system may include the insurance information 210 with a request to transmit the insurance information if a matching customer record is located at the third-party insurance system. In this other example implementation, insurance providers may advantageously avoid sharing customer information with other insurance providers. Instead the insurance systems may simply receive identification information used to lookup the contact information as well as the insurance information to share.

Figure 5:
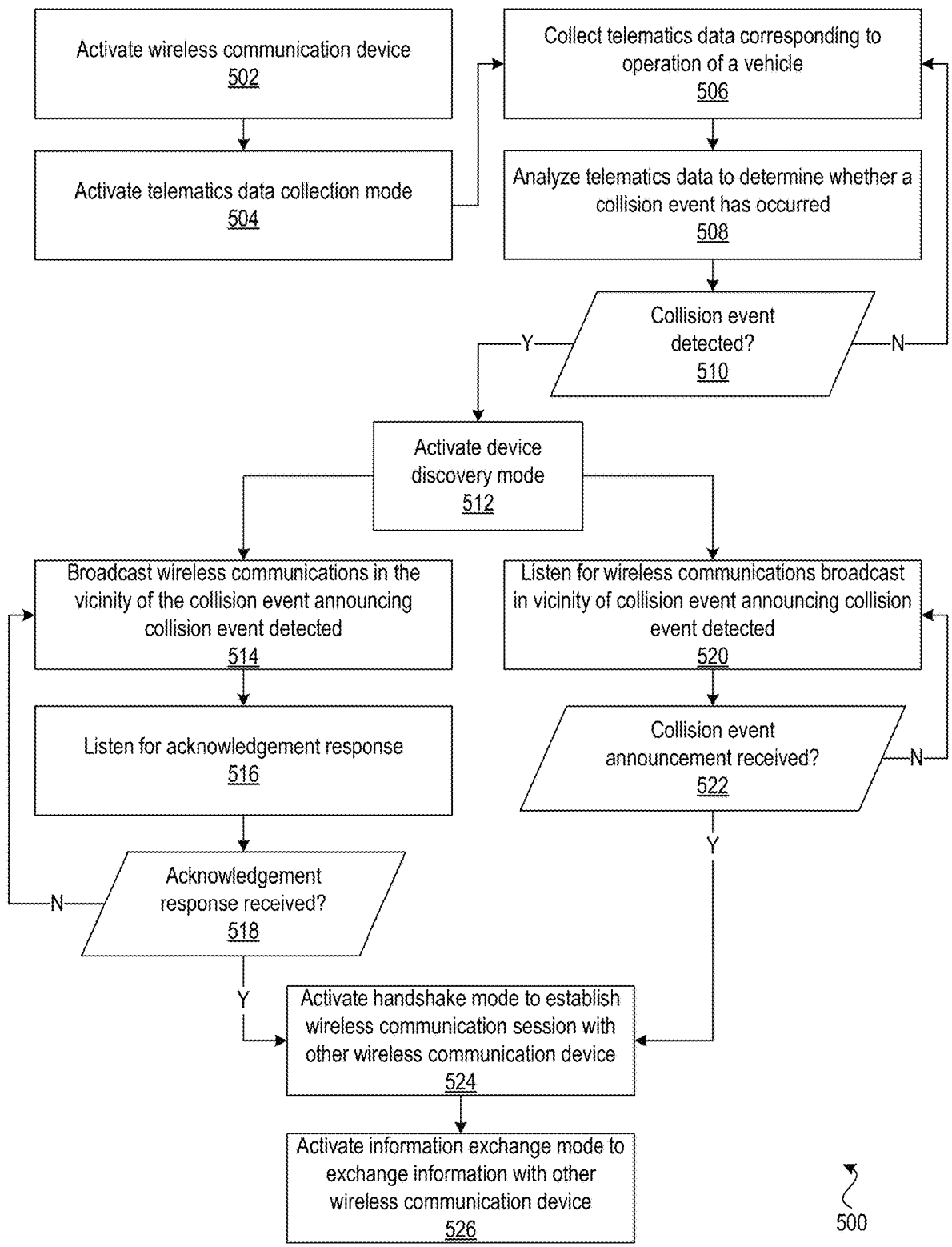
FIG. 5 is a flowchart of example method steps for automatically exchanging insurance information.

In FIG. 5, a flowchart 500 of example method steps for automatically exchanging insurance information is shown. The steps shown in FIG. 5 may be performed by one or more of the components described above with reference to FIGS. 4A-C. A driver may activate a wireless communication device (block 502) that is configured to collect and analyze telematics data to determine whether a collision event has occurred and, if so, discover other wireless devices in the vicinity of the collision event in order to initiate an exchange of insurance information. As described above, the wireless communication device may include or otherwise be in signal communication with a telematics module configured to collect the telematics data (e.g., acceleration data or GPS data) during operation of the vehicle. A telematics data collection mode may be activated (block 504) during which the telematics module may collect the telematics data. The telematics data collection mode may be manually activated in response to user input received at the wireless device or automatically activated in response to determining that vehicle ignition has occurred or that the vehicle has begun moving.

During operation of the vehicle, the telematics module may collect the telematics data (block 506), and the telematics data may be analyzed to determine whether a collision event has occurred (block 508). As noted above, the telematics module or a mobile application at the wireless device may be configured to analyze the telematics data and determine whether a collision event has occurred. In some example implementations, the telematics module or the wireless device may provide the telematics data to an insurance system that analyzes the telematics data and responds with a collision notification if a collision event is detected. If the analysis of the telematics data does not indicate that a collision event has occurred (block 510:N), then the telematics module may continue to collect the telematics data during operation of the vehicle (block 506). If, however, the analysis of the telematics data does indicate that a collision event has occurred (block 510:Y), then the wireless device may initiate a device discovery mode (block 512) to discover other wireless devices in the vicinity of the collision event that have also detected a collision event.

During the device discovery mode, the wireless device may broadcast wireless communications in the vicinity of the collision event announcing that a collision event has been detected (block 514). The wireless device may broadcast the wireless communications announcing detection of the collision event at a predetermined periodic interval, e.g., every 100, 250, 500, or 1000 milliseconds (ms). After broadcasting one or more wireless communications announcing the collision event, the wireless device may listen for any acknowledgment responses broadcast by other wireless devices in response to receipt of the collision notification communication (block 516). If the wireless device does not receive an acknowledgment response (block 518:N), then the wireless device may continue to broadcast the collision notification communications (block 514). In some example implementations the wireless device may be configured to cease broadcasting the collision notification communications after a predetermined duration, e.g., 60, 120, 300, or 600 seconds.

The wireless device may also listen for communications broadcast by other wireless devices in the vicinity of the collision event indicating that those wireless devices have also detected a collision event (block 520) during the device discovery mode. If the wireless device does not receive any collision notification communications (block 522:N), then the wireless device may continue to listen for any such communications (block 520) for a predetermined period of time, e.g., 60, 120, 300, or 600 seconds. If the wireless device has not received an acknowledgement response or a collision notification communication after that predetermined period of time, the wireless device may terminate the device discovery mode.

If, however, the wireless device receives an acknowledgement response (block 518:Y) or receives a collision notification communication (block 522:Y), the wireless device may activate a handshake mode with another wireless device in order to establish a wireless communication session with that wireless device (block 524). Once the wireless communication is established, each connected wireless device may active an information exchange mode to exchange information via the wireless communication session (block 526). As described above, the information exchanged may include one or more of: insurance information, telematics data, contact information, identification information, and so forth.

As also described above, the wireless devices themselves may exchange the insurance information or the wireless devices may request that an insurance system provide the insurance information to the operator of the other wireless device, e.g., at the other wireless device itself or using contact information included in the request. It will thus be appreciated with the benefit of this disclosure that various implementations may be selectively employed to automatically exchange insurance information in response to a collision event.

Figure 6A:
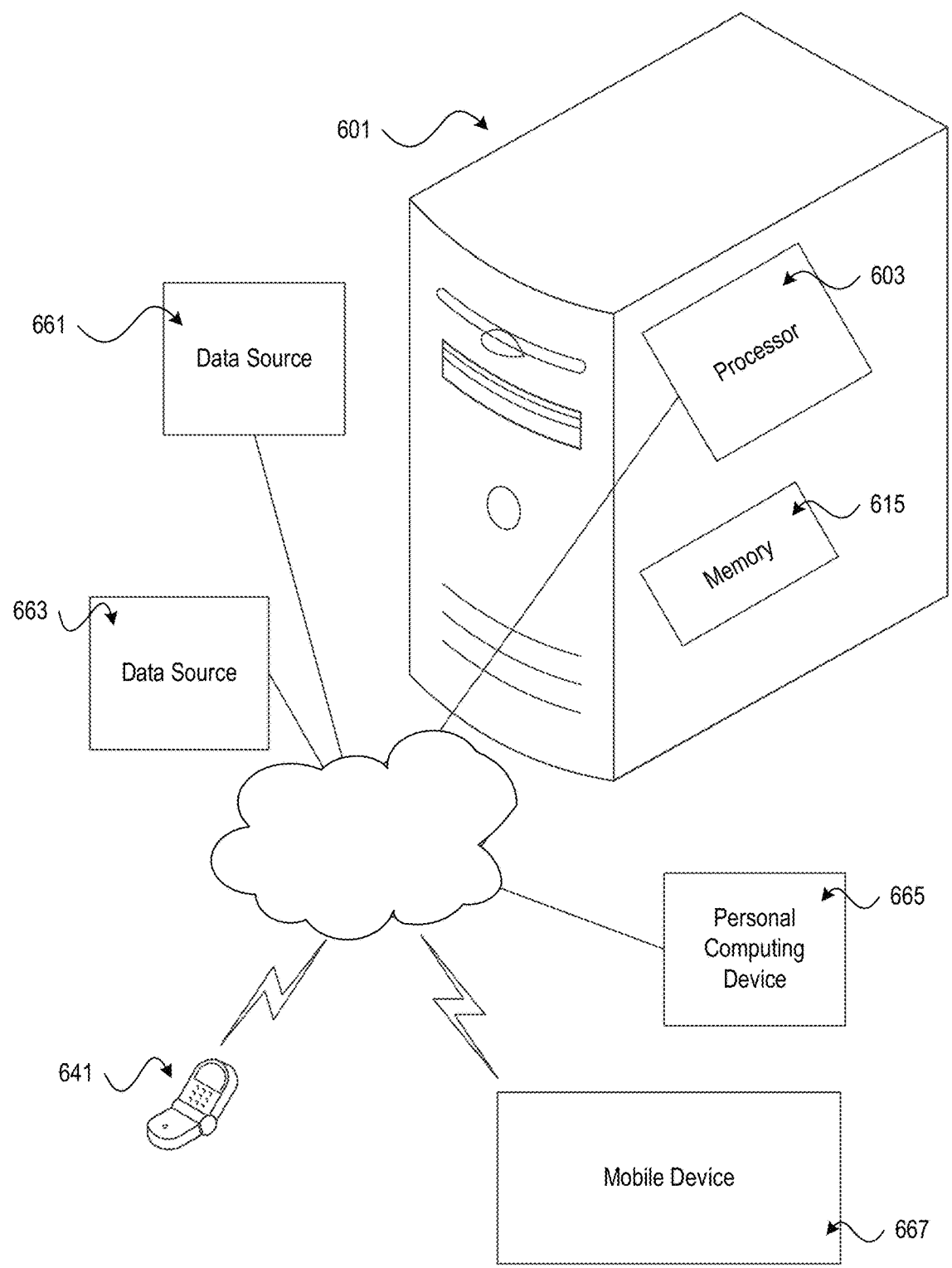
FIG. 6A is an example of an implementation of a suitable operating environment in which various aspects of the disclosure may be implemented.

Referring to FIG. 6A, an example of an implementation of a suitable operating environment in which various aspects of the disclosure may be implemented is shown. The operating environment is only one example of a suitable operating environment and is not intended to suggest any limitation as to the scope of use or functionality of the disclosure. The operating environment may be comprised of one or more data sources 661, 663 in communication with a computing device 601. The computing device 601 may use information communicated from the data sources 661, 663 to generate values that may be stored in a database format. In one embodiment, the computing device 601 may be a high-end server computer with one or more processors 603 and one or more memories 615 for storing and maintaining the values generated. The memories 615 storing and maintaining the values generated need not be physically located in the computing device 601. Rather, the memories (e.g., ROM 607, RAM 605, flash memory, hard drive memory, RAID memory, and the like) may be located in a remote data store (e.g., a memory storage area) physically located outside the computing device 601, but in communication with the computing device 601.

A personal computing device 665 (e.g., a personal computer, tablet PC, handheld computing device, personal digital assistant, mobile device, etc.) may communicate with the computing device 601. Similarly, a mobile device 667 (e.g., a mobile cellular telephone, palmtop computer, tablet computer, laptop computer, and the like) may communicate with the computing device 601. The communication between the computing device 601 and the other devices 665, 667 may be through wired or wireless communication networks or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 601 and other devices (e.g., devices 665, 667) may be connected to one or more of the networks via twisted pair wires, coaxial cable, fiber optics, radio waves or other media. The term "network" as used herein and depicted in the drawings should be broadly interpreted to include not only systems in which devices or data sources are coupled together via one or more communication paths, but also stand-alone devices that may be coupled, from time to time, to such systems that have storage capability.

In another embodiment in accordance with aspects of the disclosure, a mobile device 667 may operate in a stand-alone manner by locally storing some of the database of values stored in the memories 615 of the computing device 601. For example, a mobile device 667 (e.g., a mobile cellular telephone) may be comprised of a processor, memory, input devices 668, and output devices 669 (e.g., keypad, display screen, speaker, and the like). The memory may be comprised of a non-volatile memory that stores a database of values. Therefore, the mobile device 667 need not communicate, in one example, with a computing device 601 located at a remote location. Rather, the mobile device 667 may behave in a stand-alone manner and use its processor to perform particular steps disclosed herein. If desired, the mobile device 667 may be refreshed with an updated database of values after a period of time.

In yet another embodiment in accordance with aspects of the disclosure, a personal computing device 665 may operate in a stand-alone manner by locally storing some of the database of values stored in the memory of the computing device. For example, a personal computing device 665 may be comprised of a processor, memory, input device (e.g., keypad, CD-ROM drive, DVD drive, etc.), and output device (e.g., display screen, printer, speaker, etc.). The memory may be comprised of CD-ROM media. Therefore, the personal computing device 665 may use the input device to read the contents of the CD-ROM media. Rather, the personal computing device 665 may behave in a stand-alone manner and use its processor to perform particular steps disclosed herein. If desired, the personal computing device may be provided with an updated database of values (e.g., in the form of updated CD-ROM media) after a period of time.

The data sources 661, 663 may provide information to the computing device 601. In one embodiment in accordance with aspects of the disclosure, a data source may be a computer which contains memory storing data and is configured to provide information to the computing device 601. Some examples of providers of data sources in accordance with aspects of the disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 661, 663 may be restricted to only authorized computing devices 601 and for only permissible purposes. For example, access to the data sources may be restricted to only those persons or entities that have signed an agreement (e.g., an electronic agreement) acknowledging their responsibilities with regard to the use and security to be accorded this information.

The computing device 601 may use the information from the data sources 661, 663 to generate values that may be used to facilitate the sharing and exchange of insurance information and respond to messages indicating the sharing or exchange of insurance information. Some examples of the information that the data sources may provide to the computing device 601 include, but are not limited to, accident information, geographic information, and other types of information useful to share and exchange insurance information as well as provide other insurance-related services.

Figure 6B:
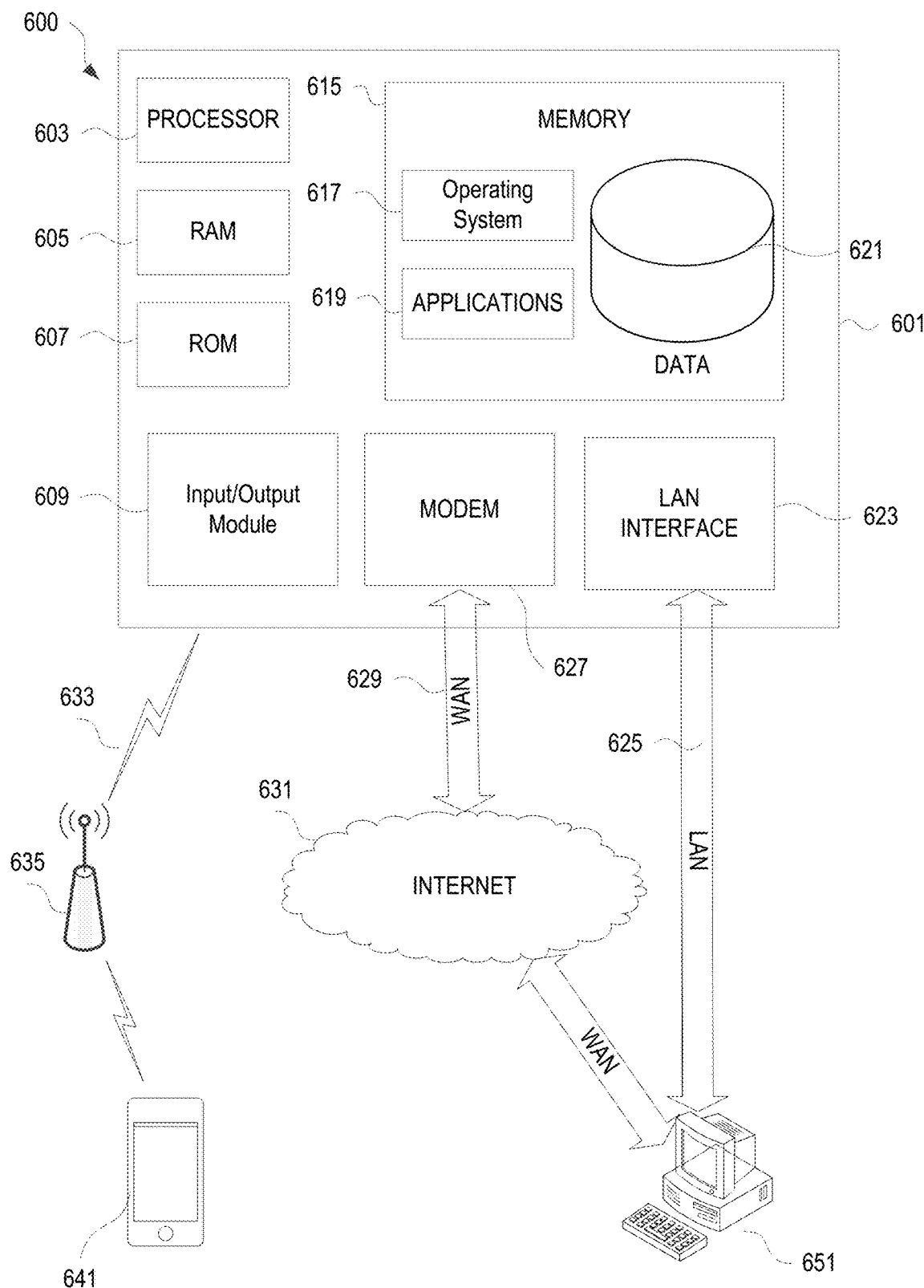
FIG. 6B is a block diagram of a system that may be used according to one or more example embodiments of the disclosure.

FIG. 6B illustrates a block diagram of a computing device (or system) 601 in the communication system 600 that may be used according to one or more illustrative embodiments of the disclosure. The device 601 may have a processor 603 for controlling overall operation of the device 601 and its associated components, including RAM 605, ROM 607, input/output (I/O) module 609, and memory 615. The computing device 601, along with one or more additional devices (e.g., terminals 641, 651) may correspond to any of multiple systems or devices, such as a system for facilitating and responding to the sharing and exchange of insurance information (FIG. 2) as described herein.

I/O module 609 may include a microphone, keypad, touch screen, and/or stylus through which a user of the computing device 601 may provide input, and may also include one or more of a speaker for providing audio output and a video display device for providing textual, audiovisual or graphical output. Software may be stored within memory 615 or storage to provide instructions to processor 603 for enabling device 601 to perform various functions. For example, memory 615 may store software used by the device 601, such as an operating system 617, application programs 619, and an associated internal database 621. Processor 603 and its associated components may allow the system to execute a series of computer-readable instructions to, e.g., collect and analyze telematics data, discover other wireless devices in the vicinity of a collision event, and initiate an exchange of information with such devices.

The system may operate in a networked environment supporting connections to one or more remote computers, such as terminals 641 and 651. The terminals 641 and 651 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the system 601. The network connections may include a local area network (LAN) 625 and a wide area network (WAN) 629, and a wireless telecommunications network 633, but may also include other networks. When used in a LAN networking environment, the system may be connected to the LAN 625 through a network interface or adapter 623. When used in a WAN networking environment, the system 601 may include a modem 627 or other means for establishing communications over the WAN 629, such as network 631 (e.g., the Internet). When used in a wireless telecommunications network 633, the system 601 may include one or more transceivers, digital signal processors, and additional circuitry and software for communicating with wireless computing devices 641 (e.g., mobile phones, vehicle telematics devices) via one or more network devices 635 (e.g., base transceiver stations) in the wireless network 633.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and system components described herein may be configured to communicate using any of these network protocols or technologies.

Additionally, one or more application programs 619 used by the system may include computer-executable instructions (e.g., telematics analysis programs or modules, device discovery programs or modules, information exchange programs or modules, etc.) for collecting and analyzing telematics data, discovering other wireless devices in the vicinity of a collision event, initiating an exchange of information with such devices, and performing other related functions as described herein. The computer-executable instructions may be stored on computer-readable media which, as used in this disclosure, refers to all types of computer-readable media with the sole exception being a transitory propagating signal.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure.

What is claimed is:

1. A computer-implemented method comprising:
    generating, at a first wireless computing device during operation of a vehicle, first vehicle operation data describing operation of the vehicle;
    detecting, by the first wireless computing device, a collision event involving the vehicle based on the first vehicle operation data;
    receiving, by the first wireless computing device and from an insurance system, first insurance information;
    wherein detection of the collision event activates the first wireless computing device to initiate a discovery mode to determine whether a second wireless computing device is located in a vicinity of the collision event and also detected at least one collision event;
    discovering, by the first wireless computing device, a second wireless computing device, the discovering including receiving, by the first wireless computing device, a response from the second wireless computing device;
    responsive to discovery of the second wireless computing device:
        activating a communication session between the first wireless computing device and the second wireless computing device,
        initiating transmission by the first wireless computing device to the second wireless computing device, of the first insurance information and at least a portion of the first vehicle operation data,
        receiving, from the second wireless computing device, second insurance information and second vehicle operation data, and
        transmitting, to the insurance system, third vehicle operation data comprising the second vehicle operation data and at least a portion of the first vehicle operation data; and
    identifying, by the insurance system, an at-fault participant for the collision event based on the third vehicle operation data.

2. The computer-implemented method of claim 1, wherein initiating the discovery mode includes broadcasting an indication that a collision event has occurred.

3. The computer-implemented method of claim 2 wherein:
    the broadcast by the first wireless computing device includes an identifier associated with an operator of the first wireless computing device.

4. The computer-implemented method of claim 1 wherein:
    the discovery mode further comprises receiving, at the first wireless computing device, a wireless communication from the second wireless computing device indicating that the second wireless computing device has detected at least one collision event.

5. The computer-implemented method of claim 1 wherein:
    the first wireless computing device initiates transmission by transmitting, to the insurance system, a request comprising an identifier associated with the second wireless computing device; and
    receipt of the request causes the insurance system to transmit the first insurance information to the second wireless computing device.

6. The computer-implemented method of claim 1 wherein:
establishing the wireless communication session between the first wireless computing device and the second wireless computing device activates the first wireless computing device to:
transmit, to the second wireless computing device during the wireless communication session between the first wireless computing device and the second wireless computing device, at least a portion of the first vehicle operation data, and
receive, from the second wireless computing device during the wireless communication session between the first wireless computing device and the second wireless computing device, the second vehicle operation data.

7. The computer-implemented method of claim 1 wherein:
the insurance system is associated with an insurance provider that insures an operator associated with the first wireless computing device.

8. The computer-implemented method of claim 1 wherein:
receipt of the third vehicle operation data further causes the insurance system to identify an order in which a plurality of collision events occurred based on the third vehicle operation data.

9. The computer-implemented method of claim 1 wherein:
the first vehicle operation data comprises acceleration data generated by an accelerometer of the first wireless computing device; and
detection of the collision event is based on an analysis of the acceleration data at the first wireless computing device.

10. The computer-implemented method of claim 1 wherein:
receipt of the third vehicle operation data at the insurance system further causes the insurance system to automatically create an insurance claim and automatically populate the insurance claim with information associated with an individual associated with the first wireless computing device.

11. A wireless computing device comprising:
one or more processors; and
memory storing computer-readable instructions that, when executed by one of the processors, cause the wireless computing device to:
generate, during operation of a vehicle, vehicle operation data describing operation of the vehicle;
detect a collision event involving the vehicle based on the vehicle operation data;
receive, from an insurance system, first insurance information;
responsive to detection of the collision event, initiate a discovery mode in order to determine whether a second wireless computing device within a vicinity of the collision event has also detected at least one collision event;
discover the second wireless computing device, the discovering including receiving a response from the second wireless computing device;
responsive to discovering the second wireless computing device:
activating a communication session between the wireless computing device and the second wireless computing device,
initiating an exchange of the first insurance information and vehicle operation data with the second wireless computing device, and
transmitting, to the insurance system, the exchanged vehicle operation data; and
wherein receipt of the exchanged vehicle operation data causes the insurance system to identify an at-fault participant for the collision event based on the exchanged vehicle operation data.

12. The wireless computing device of claim 11, wherein initiating the discover mode further includes broadcasting an indication that a collision event has occurred.

13. The wireless computing device of claim 11 wherein:
the discovery mode further comprises broadcasting, at a periodic interval, individual wireless communications that indicate the wireless computing device has detected the collision involving the vehicle.

14. The wireless computing device of claim 11 wherein:
the discovery mode further comprises receiving a wireless communication from the second wireless computing device indicating that the second wireless computing device has detected at least one collision event.

15. The wireless computing device of claim 11 wherein:
the instructions, when executed by the one or more processors, further cause the wireless computing device to, responsive to detection of the collision event,
transmit, to the insurance system, a request comprising an identifier associated with the other wireless computing device; and
wherein receipt of the request causes the insurance system to transmit insurance information associated with an operator of the wireless computing device to the other wireless computing device.

16. The wireless computing device of claim 11 further comprising:
an accelerometer; and
wherein the vehicle operation data comprises acceleration data generated by the accelerometer.

17. The wireless computing device of claim 11 further comprising:
a wireless transceiver having an effective radiated power of around 25 milliwatts to around 100 milliwatts.

18. The wireless computing device of claim 11, wherein:
receipt of the exchanged vehicle operation data at the insurance system further causes the insurance system to automatically create an insurance claim and automatically populate the insurance claim with information associated with an individual associated with the wireless computing device.

19. One or more non-transitory computer-readable media storing computer-executable instructions that, when executed by a computing device, cause the computing device to:
generate, during operation of a vehicle, vehicle operation data describing operation of the vehicle;
detect a collision event involving the vehicle based on the vehicle operation data;
receive, from an insurance system, first insurance information;
responsive to detection of the collision event, initiate a discovery mode in order to determine whether a second wireless computing device within a vicinity of the collision event has also detected at least one collision event;
discover the second wireless computing device, the discovering including receiving a response from the second wireless computing device;

responsive to discovering the second wireless computing device:
- activating a communication session between the computing device and the second wireless computing device,
- initiating an exchange of the first insurance information and vehicle operation data with the second wireless computing device, and
- transmitting, to the insurance system, the exchanged vehicle operation data; and wherein receipt of the exchanged vehicle operation data causes the insurance system to identify an at-fault participant for the collision event based on the exchanged vehicle operation data.

20. The one or more non-transitory computer-readable media of claim 19, wherein initiating the discover mode further includes broadcasting an indication that a collision event has occurred.

* * * * *